(12) United States Patent
Luo et al.

(10) Patent No.: US 9,961,684 B2
(45) Date of Patent: May 1, 2018

(54) MULTICARRIER SELECTION METHOD AND DEVICE

(71) Applicant: Huawei Technologies Co., Ltd., Shenzhen (CN)

(72) Inventors: Chao Luo, Shanghai (CN); Jiehua Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 15/043,142

(22) Filed: Feb. 12, 2016

(65) Prior Publication Data

US 2016/0165612 A1   Jun. 9, 2016

Related U.S. Application Data

(63) Continuation of application No. PCT/CN2013/081489, filed on Aug. 14, 2013.

(51) Int. Cl.
*H04W 4/00* (2009.01)
*H04W 72/04* (2009.01)
*H04L 5/00* (2006.01)

(52) U.S. Cl.
CPC ......... *H04W 72/0453* (2013.01); *H04L 5/001* (2013.01); *H04L 5/0041* (2013.01)

(58) Field of Classification Search
CPC ... H04W 72/0453; H04L 5/001; H04L 5/0041
(Continued)

(56) References Cited

U.S. PATENT DOCUMENTS

| 2010/0172428 A1* | 7/2010 | Pani ............... H04L 1/0026 375/262 |
| 2010/0184433 A1* | 7/2010 | Plestid ............ H04W 48/18 455/435.2 |

(Continued)

FOREIGN PATENT DOCUMENTS

| CN | 102187727 A | 9/2011 |
| CN | 201380000914.1 | 11/2017 |
| WO | WO 2012150887 A1 | 11/2012 |

OTHER PUBLICATIONS

"Comments to GP-120932 (Downlink Multi-Carrier: Network Case Studies)," 3GPP TSG GERAN #55, Vienna, Austria, GP-121026, Agenda Item 7.1.5.4, $3^{rd}$ Generation Partnership Project, Valbonne, France (Aug. 27-31, 2012).

(Continued)

*Primary Examiner* — Faisal Choudhury
(74) *Attorney, Agent, or Firm* — Leydig, Voit & Mayer, Ltd.

(57) ABSTRACT

Embodiments of the disclosure provide a carrier selection method and device for multicarrier, to implement that an optimal carrier combination is obtained by searching. The method includes: acquiring an absolute radio frequency channel number ARFCN that is of each carrier of N carriers allocated to a receiving end and in each frame of a radio block, where N is a positive integer, and N≥2; respectively selecting, from the N carriers, a different carrier as an anchor carrier, and searching within a search range of the anchor carrier according to the ARFCN of each carrier in each frame of the radio block and a maximum carrier frequency spacing supported by the receiving end, to determine a carrier set of the anchor carrier; and selecting, from the carrier sets of anchor carriers of the N carriers, at least one carrier set as a carrier selection result.

18 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2010/0272017 | A1* | 10/2010 | Terry | H04W 48/12 370/328 |
| 2011/0268032 | A1 | 11/2011 | Kim et al. | |
| 2011/0286411 | A1 | 11/2011 | Kim et al. | |
| 2014/0044085 | A1* | 2/2014 | Hong | H04L 5/0037 370/329 |
| 2015/0334770 | A1 | 11/2015 | Kwon et al. | |
| 2016/0007312 | A1* | 1/2016 | Cherry | H04W 60/005 455/435.3 |

OTHER PUBLICATIONS

"On Carrier Selection for Downlink Multi-carrier (Update of GP-130199)," 3GPP TSG GERAN #58, Xiamen, P.R. China, GP-130427, Agenda Item 7.1.5.2.2, $3^{rd}$ Generation Partnership Project, Valbonne, France (May 13-17, 2013).

"DLMC—Network Case Studies (update of GP-130214)," 3GPP TSG GERAN #58, Xiamen, P.R. China, Tdoc GP-130456, Agenda Item 7.1.5.2.2, $3^{rd}$ Generation Partnership Project, Valbonne, France (May 13-17, 2013).

"DLMC—Support of non-contiguous reception (update of GP-130217)," 3GPP TSG GERAN #58, Xiamen, P.R. China, Tdoc GP-130458, Agenda Item 7.1.5.2.2, 7.2.5.3.1, $3^{rd}$ Generation Partnership Project, Valbonne, France (May 13-17, 2013).

"DLMC—On carrier selection," 3GPP TSG GERAN #58, Xiamen, P.R. China, Tdoc GP-130459, Agenda Item 7.1.5.2.2, 7.2.5.3.1, $3^{rd}$ Generation Partnership Project, Valbonne, France (May 13-17, 2013).

"$3^{rd}$ Generation Partnership Project; Technical Specification Group GSM/EDGE Radio Access Network; Multiplexing and multiple access on the radio path (Release 11)," 3GPP TS 45.002, V11.2.0, pp. 1-113, $3^{rd}$ Generation Partnership Project, Valbonne, France (Mar. 2013).

* cited by examiner

MULTICARRIER SELECTION METHOD AND DEVICE

CROSS-REFERENCE TO RELATED APPLICATIONS

This application is a continuation of International Patent Application No. PCT/CN2013/081489, filed on Aug. 14, 2013, which is hereby incorporated by reference in its entirety.

TECHNICAL FIELD

Embodiments of the disclosure relate to the communications field, and in particular, to a multicarrier selection method and device.

BACKGROUND

A GSM EDGE radio access network (GERAN) system base station may communicate with one terminal by using multiple carriers at non-contiguous frequencies. Four contiguous frames on one packet data channel (PDCH) in a PS domain on a GERAN constitute one radio block, and data encoding and decoding are performed in a unit of radio block. In a downlink multicarrier (DLMC) feature, due to a limitation of a maximum carrier frequency spacing supported by a terminal, a case in which data on some carriers cannot be received in each radio block period may occur. In this case, a carrier selection method may be used, so that a transmit end and a receiving end perform information transmission by using a uniform carrier. For example, the transmit end may select some carriers of multiple carriers for sending, and correspondingly, the receiving end listens to a downlink radio block only on the some carriers.

In the prior art, a carrier selection method used is a brute force method, in which all carrier selection solutions are enumerated to find a solution that has a largest quantity of carriers and meets a limitation of a maximum carrier frequency spacing supported by a terminal. The brute force method is equivalent to finding a maximal complete subgraph of an undirected graph, which has extremely high calculation complexity.

SUMMARY

Embodiments of the disclosure provide a multicarrier selection method and device, implementing that a downlink multicarrier carrier combination is obtained by searching by using a method with relatively low complexity.

To achieve the foregoing objective, the following technical solutions are used in the embodiments of the disclosure:

According to a first aspect, a carrier selection method for multicarrier is provided, including:
  acquiring an absolute radio frequency channel number ARFCN that is of each carrier of N carriers allocated to a receiving end and in each frame of a radio block, where N is a positive integer, and N≥2;
  respectively selecting, from the N carriers, a different carrier as an anchor carrier, and searching within a search range of the anchor carrier according to the ARFCN of each carrier in each frame of the radio block and a maximum carrier frequency spacing supported by the receiving end, to determine a carrier set of the anchor carrier; and
  selecting, from the carrier sets of anchor carriers of the N carriers, at least one carrier set as a carrier selection result.

In a first possible implementation manner, according to the first aspect, the respectively selecting, from the N carriers, a different carrier as an anchor carrier includes using each carrier of the N carriers as the anchor carrier.

In a second possible implementation manner, according to the first aspect, the respectively selecting, from the N carriers, a different carrier as an anchor carrier includes:
  sequentially using each carrier of the N carriers as the anchor carrier according to a preset first direction; or
  selecting, from the N carriers, the first carrier in a preset first direction as a first anchor carrier according to the preset first direction; after a search within a search range of the first anchor carrier ends, and a carrier set of the first anchor carrier is determined, determining a next carrier that is of the N carriers in the preset first direction and adjacent to a carrier at the most front in the preset first direction in the carrier set of the first anchor carrier; and if the next carrier is located in front of the first anchor carrier in the preset first direction, using the next carrier as a second anchor carrier.

In a third possible implementation manner, with reference to the second possible implementation manner, the preset first direction includes:
  an ascending-order direction of carrier IDs of the N carriers; or
  a descending-order direction of carrier IDs of the N carriers; or
  an ascending-order direction of ARFCNs of the N carriers in any frame of the radio block; or
  a descending-order direction of ARFCNs of the N carriers in any frame of the radio block.

In a fourth possible implementation manner, with reference to the second possible implementation manner or the third possible implementation manner, the search range of the anchor carrier is from a next carrier that is of the N carriers in the preset first direction and adjacent to the anchor carrier to the last carrier of the N carriers in the preset first direction.

In a fifth possible implementation manner, with reference to the first aspect or any one of the first possible implementation manner to the fourth possible implementation manner, the search range of the anchor carrier includes all carriers, except the anchor carrier, of the N carriers.

In a sixth possible implementation manner, with reference to the first aspect or any one of the first possible implementation manner to the fifth possible implementation manner, the searching within a search range of the anchor carrier according to the ARFCN of each carrier in each frame of the radio block and a maximum carrier frequency spacing supported by the receiving end, to determine a carrier set of the anchor carrier includes:
  sequentially selecting, according to a preset search direction, a first carrier from a carrier that is not searched within the search range of the anchor carrier, and calculating a difference between a largest ARFCN and a smallest ARFCN of ARFCNs that are of the first carrier and all carriers in a first set of the anchor carrier and in each frame of the radio block; and
  if the difference between the largest ARFCN and the smallest ARFCN of the ARFCNs that are of the first carrier and all the carriers in the first set and in any frame of the radio block is greater than the maximum carrier frequency spacing supported by the receiving end, ending the search within the search range of the anchor carrier, and using the first set as the carrier set of the anchor carrier; or if the difference between the largest ARFCN and the smallest ARFCN in each frame of the radio block of the first carrier and all the carriers in the first set is not greater than the maximum carrier frequency spacing supported by the receiving end, adding the first carrier to the first set; where the first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In a seventh possible implementation manner, with reference to the first aspect or any one of the first possible implementation manner to the sixth possible implementation manner, the preset search direction includes:

an ascending-order direction of carrier IDs of all carriers within the search range of the anchor carrier; or a descending-order direction of carrier IDs of all carriers within the search range of the anchor carrier; or an ascending-order direction of ARFCNs that are of all carriers within the search range of the anchor carrier and in any frame of the radio block; or a descending-order direction of ARFCNs that are of all carriers within the search range of the anchor carrier and in any frame of the radio block; or a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and $1<i<N$.

In an eighth possible implementation manner, with reference to the first aspect or any one of the first possible implementation manner to the seventh possible implementation manner, the searching within a search range of the anchor carrier according to the ARFCN of each carrier of the N carriers in each frame of the radio block and a maximum carrier frequency spacing supported by the receiving end, to determine a carrier set of the anchor carrier includes:

selecting a first carrier from a carrier that is not searched within the search range of the anchor carrier, and calculating a difference between a largest ARFCN and a smallest ARFCN of ARFCNs that are of the first carrier and all carriers in a first set of the anchor carrier and in each frame of the radio block;

if the difference between the largest ARFCN and the smallest ARFCN of the ARFCNs that are of the first carrier and all the carriers in the first set and in each frame of the radio block is not greater than the maximum carrier frequency spacing supported by the receiving end, adding the selected first carrier to the first set; and determining whether there is a carrier that is not searched within the search range of the anchor carrier; and if it is determined that there is a carrier that is not searched within the search range of the anchor carrier, selecting a second carrier from the carrier that is not searched within the search range of the anchor carrier; or if it is determined that there is no carrier that is not searched within the search range of the anchor carrier, ending the search within the search range of the anchor carrier, and using the first set as the carrier set of the anchor carrier; where the first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In a ninth possible implementation manner, with reference to the first aspect or any one of the first possible implementation manner to the eighth possible implementation manner, the selecting, from carrier sets of the anchor carriers of the N carriers, at least one carrier set as a carrier selection result includes:

when a single channel is configured for the receiving end, selecting, from the carrier sets of the anchor carriers of the N carriers, a carrier set that includes a largest quantity of carriers and has a smallest sum of carrier IDs of the included carriers as a carrier selection result of the single channel; or selecting, from the carrier sets of the anchor carriers of the N carriers, a carrier set that includes a largest quantity of carriers and has a largest sum of carrier IDs of the included carriers as a carrier selection result of the single channel; or when multiple channels are configured for the receiving end, determining a carrier selection result of each channel of the multiple channels according to a quantity of carriers included in the carrier set of each anchor carrier of the N carriers.

In a tenth possible implementation manner, with reference to the first aspect or any one of the first possible implementation manner to the eighth possible implementation manner, when multiple channels are configured for the receiving end, the selecting, from the carrier sets of anchor carriers of the N carriers, at least one carrier set as a carrier selection result includes:

selecting, from the carrier sets of the anchor carriers, one carrier set as a carrier selection result of a first channel of the multiple channels; and after the selecting, from the carrier sets of the anchor carriers of the N carriers, at least one carrier set as a carrier selection result, the method further includes:

obtaining M carriers by excluding the carrier in the carrier selection result of the first channel from the N carriers;

respectively selecting, from the M carriers, a different carrier as an anchor carrier, determining a first search range of the anchor carrier in the M carriers, searching within the first search range of the anchor carrier according to ARFCNs of the M carriers in each frame of the radio block and the maximum carrier frequency spacing supported by the receiving end, and determining a first carrier set of the anchor carrier; and selecting, from the first carrier sets of anchor carriers of the M carriers, one carrier set as a carrier selection result of a second channel of the multiple channels.

In an eleventh possible implementation manner, with reference to the first aspect or any one of the first possible implementation manner to the tenth possible implementation manner, the acquiring an absolute radio frequency channel number ARFCN that is of each carrier of N carriers allocated to a receiving end and in each frame of a radio block includes:

calculating an ARFCN of any carrier of the N carriers in each frame of the radio block according to a frequency parameter that is of the any carrier and carried in an assign message, where the frequency parameter includes a mobile radio frequency channel allocation set MA, a hopping sequence number HSN, and a mobile allocation index offset MAIO; or setting a designated ARFCN that is of any carrier and carried in an assign message as an ARFCN of the any carrier in each frame.

In a twelfth possible implementation manner, with reference to the eleventh possible implementation manner, a quantity of the MAs is greater than or equal to 2.

According to a second aspect, a selection device for multicarrier is provided, including: an acquiring unit, configured to acquire an absolute radio frequency channel number ARFCN that is of each carrier of N carriers allocated to a receiving end and in each frame of a radio block, where N is a positive integer, and N≥2;

a searching unit, configured to: respectively select, from the N carriers, a different carrier as an anchor carrier, and search within a search range of the anchor carrier according to the ARFCN that is of each carrier of the N carriers in each frame of the radio block and acquired by the acquiring unit and a maximum carrier frequency spacing supported by the receiving end, to determine a carrier set of the anchor carrier; and a selection unit, configured to select, from the carrier sets that are of anchor carriers of the N carriers and determined by the searching unit, at least one carrier set as a carrier selection result.

In a first possible implementation manner, according to the second aspect, the searching unit includes an anchor carrier selection module, configured to use each carrier of the N carriers as the anchor carrier.

In a second possible implementation manner, according to the second aspect, the searching unit includes an anchor carrier selection module, configured to: sequentially use each carrier of the N carriers as the anchor carrier according to a preset first direction; or configured to: select, from the N carriers, the first carrier in a preset first direction as a first anchor carrier according to the preset first direction; after a search within a search range of the first anchor carrier ends, and a carrier set of the first anchor carrier is determined, determine a next carrier that is of the N carriers in the preset first direction and adjacent to a carrier at the most front in the preset first direction in the carrier set of the first anchor carrier; and if the next carrier is located in front of the first anchor carrier in the preset first direction, use the next carrier as a second anchor carrier.

In a third possible implementation manner, with reference to the second possible implementation manner, the preset first direction includes:

an ascending-order direction of carrier IDs of the N carriers; or a descending-order direction of carrier IDs of the N carriers; or an ascending-order direction of ARFCNs of the N carriers in any frame of the radio block; or a descending-order direction of ARFCNs of the N carriers in any frame of the radio block.

In a fourth possible implementation manner, with reference to the second possible implementation manner or the third possible implementation manner, the search range of the anchor carrier is from a next carrier that is of the N carriers in the preset first direction and adjacent to the anchor carrier to the last carrier of the N carriers in the preset first direction.

In a fifth possible implementation manner, with reference to the second aspect or any one of the first possible implementation manner to the fourth possible implementation manner, the search range of the anchor carrier includes all carriers, except the anchor carrier, of the N carriers.

In a sixth possible implementation manner, with reference to the second aspect or any one of the first possible implementation manner to the fifth possible implementation manner, the searching unit includes a searching module, configured to: select, according to a preset search direction, a first carrier from a carrier that is not searched within the search range of the anchor carrier, and calculate a difference between a largest ARFCN and a smallest ARFCN of ARFCNs that are of the first carrier and all carriers in a first set of the anchor carrier and in each frame of the radio block; and if the difference between the largest ARFCN and the smallest ARFCN of the ARFCNs that are of the first carrier and all the carriers in the first set and in any frame of the radio block is greater than the maximum carrier frequency spacing supported by the receiving end, end the search within the search range of the anchor carrier, and use the first set as the carrier set of the anchor carrier; or if the difference between the largest ARFCN and the smallest ARFCN of the ARFCNs that are of the radio block of the first carrier and all the carriers in the first set and in each frame of the radio block is not greater than the maximum carrier frequency spacing supported by the receiving end, add the first carrier to the first set; where the first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In a seventh possible implementation manner, with reference to the sixth possible implementation manner, the preset search direction includes: an ascending-order direction of carrier IDs of all carriers within the search range of the anchor carrier; or a descending-order direction of carrier IDs of all carriers within the search range of the anchor carrier; or an ascending-order direction of ARFCNs that are of all carriers within the search range of the anchor carrier and in any frame of the radio block; or a descending-order direction of ARFCNs that are of all carriers within the search range of the anchor carrier and in any frame of the radio block; or a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and 1<i<N.

In an eighth possible implementation manner, with reference to the second aspect or any one of the first possible implementation manner to the fifth possible implementation manner, the searching unit includes a searching module, configured to: select a first carrier from a carrier that is not searched within the search range of the anchor carrier, and calculate a difference between a largest ARFCN and a smallest ARFCN of ARFCNs that are of the first carrier and all carriers in a first set of the anchor carrier and in each frame of the radio block;

if the difference between the largest ARFCN and the smallest ARFCN of the ARFCNs that are of the first carrier and all the carriers in the first set and in each frame of the radio block is not greater than the maximum carrier frequency spacing supported by the receiving end, add the selected first carrier to the first set of the anchor carrier; and determine whether there is a carrier that is not searched within the search range of the anchor carrier; and if it is determined that there is a carrier that is not searched within the search range of the anchor carrier, select a second carrier from the carrier that is not searched within the search range of the anchor carrier; or if it is determined that there is no carrier that is not searched within the search range of the anchor carrier, end the search within the search range of the anchor carrier, and use the first set as the carrier set of the anchor carrier; where the first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In a ninth possible implementation manner, with reference to the second aspect or any one of the first possible implementation manner to the eighth possible implementation manner, the selection unit is configured to: when a single channel is configured for the receiving end, select, from the carrier sets that are of the anchor carriers of the N carriers and determined by the searching unit, a carrier set that includes a largest quantity of carriers and has a smallest sum of carrier IDs of the included carriers as a carrier selection result of the single channel; or select, from the carrier sets of the anchor carriers, a carrier set that includes a largest quantity of carriers and has a largest sum of carrier IDs of the included carriers as a carrier selection result of the single channel; or when multiple channels are configured for the receiving end, determine a carrier selection result of each channel of the multiple channels according to a quantity of carriers included in the carrier set that is of each anchor carrier of the N carriers and determined by the searching unit and the sum of carrier IDs of the carriers included in the carrier set of each anchor carrier of the N carriers.

In a tenth possible implementation manner, with reference to the second aspect or any one of the first possible implementation manner to the eighth possible implementation manner, when multiple channels are configured for the receiving end, the selection unit is configured to:

select, from the carrier sets that are of the anchor carriers of the N carriers and determined by the searching unit, one carrier set as a carrier selection result of a first channel of the multiple channels, and transmit the carrier selection result of the first channel to the searching unit;

the searching unit is further configured to: obtain M carriers by excluding the carrier in the carrier selection result that is of the first channel and selected by the selection unit from the N carriers; and respectively select, from the M carriers, a different carrier as an anchor carrier, determine a first search range of the anchor carrier in the M carriers, search within the first search range of the anchor carrier according to ARFCNs of the M carriers in each frame of the radio block and the maximum carrier frequency spacing supported by the receiving end, and determine a first carrier set of the anchor carrier; and the selection unit is further configured to select, from the first carrier sets that are of anchor carriers of the M carriers and determined by the searching unit, one carrier set as a carrier selection result of a second channel of the multiple channels.

In an eleventh possible implementation manner, with reference to the second aspect or any one of the first possible implementation manner to the tenth possible implementation manner, the acquiring unit is configured to:

calculate an ARFCN of any carrier of the N carriers in each frame of the radio block according to a frequency parameter that is of the any carrier and carried in an assign message, where the frequency parameter includes a mobile radio frequency channel allocation set MA, a hopping sequence number HSN, and a mobile allocation index offset MAIO; or set a designated ARFCN that is of any carrier and carried in an assign message as an ARFCN of the any carrier in each frame.

In a twelfth possible implementation manner, with reference to the eleventh possible implementation manner of the second aspect, a quantity of the MAs is greater than or equal to 2.

The embodiments of the disclosure provide a carrier selection method and device for multicarrier. An absolute radio frequency channel number ARFCN that is of each carrier of N carriers allocated to a receiving end and in each frame of a radio block is acquired, different carriers are selected as anchor carriers, a search is performed within a search range of each anchor carrier according to the ARFCN of each carrier in each frame of the radio block and a maximum carrier frequency spacing supported by the receiving end, to determine a carrier set of each anchor carrier, and at least one carrier set is selected, from the carrier sets of all anchor carriers of the N carriers, as a carrier selection result. Compared with a brute force method in the prior art, in the embodiments of the disclosure, selection of anchor carriers is performed according to a preset rule, and carrier sets of the anchor carriers are determined, and a carrier selection result is selected from the carrier sets of the anchor carriers, implementing that a downlink multicarrier carrier combination is obtained by searching by using a method with relatively low complexity.

BRIEF DESCRIPTION OF DRAWINGS

To describe the technical solutions in the embodiments of the disclosure or in the prior art more clearly, the following briefly introduces the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

The following clearly describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the present application.

A selection method for multicarrier provided in the embodiments of the disclosure may be applied to a GERAN system, and a GERAN system base station may communicate with one terminal by using multiple carriers. It should be noted that the multicarrier herein is not multiple carriers at contiguous frequencies, but may be spaced frequency resources allocated in spaced absolute radio frequency channel numbers (ARFCN) (in a case in which frequency hopping is not performed) or a mobile allocation index offset (MAIO), a mobile radio frequency channel allocation (MA) set, and a hopping sequence number (HSN) (in a case in which frequency hopping is performed).

Figure 1:
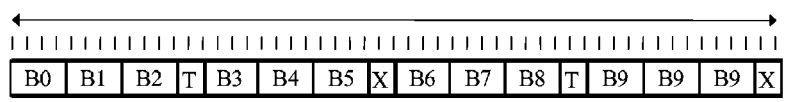
FIG. 1 is a structural diagram of a frame.

Referring to FIG. 1, FIG. 1 is a schematic structural diagram of a multiframe on a PDCH channel in a PS domain on a GERAN. As shown in the figure, four contiguous frames (or timeslots or bursts) in the PS domain on the GERAN constitute one radio block (indicated by B in the figure), and data encoding and decoding are performed in a unit of radio block. For a DLMC, because of a limitation of a maximum carrier frequency spacing supported by a terminal, in each radio block period, a case in which data on some carriers cannot be received may occur. For example, if the maximum carrier frequency spacing supported by the terminal is 25 (in a unit of a quantity of ARFCNs, where each ARFCN is 200 kHz, and in this case, a maximum carrier frequency spacing bandwidth supported by the terminal is 200*25=5 MHz), and in a frame, three carriers are corresponding to frequency channel numbers whose ARFCNs are 35, 45, and 70, respectively, a maximum carrier frequency spacing is 35, which exceeds the maximum carrier frequency spacing supported by the terminal; in this case, if data is delivered on the three carriers, the terminal can receive data only on some carriers.

In this case, a method may be used, so that a transmit end and a receiving end separately perform data transmission by using a uniform carrier. For example, the transmit end may select some carriers for sending, and accordingly, the receiving end listens only on the some carriers to detect whether there is a radio block.

The embodiments of the disclosure provide a selection method and device for multicarrier, and the multicarrier selection method provided in the embodiments of the disclosure is applicable to a transmit end and a receiving end, and may be further applicable to a case in which frequency hopping is performed on a carrier and a case in which frequency hopping is not performed on a carrier. The selection device for multicarrier provided in the embodiments of the disclosure may be disposed at the transmit end and the receiving end.

In consideration of complexity of transmitting a multi-carrier signal by a terminal (such as a mobile phone), generally, a multicarrier-based transmission technology is mainly used for sending downlink data. In the embodiments of the disclosure, a downlink carrier selection is merely used as an example for description.

Figure 2:
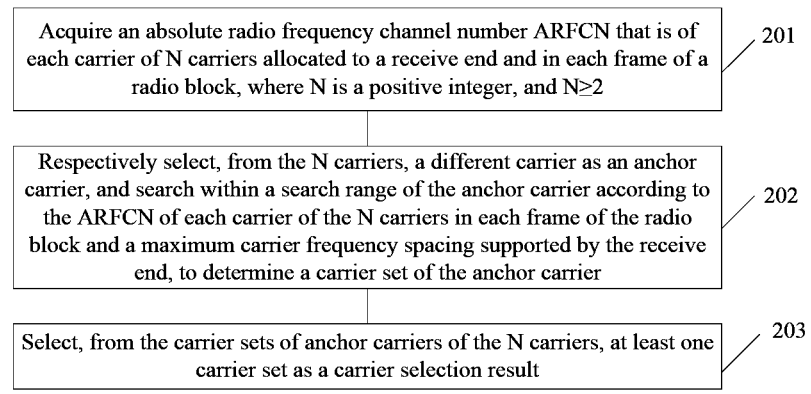
FIG. 2 is a flowchart of a carrier selection method for multicarrier according to an embodiment of the disclosure.

Referring to FIG. 2, FIG. 2 shows a selection method for multicarrier according to an embodiment of the disclosure. As shown in the figure, the method may include the following steps:

201. Acquire an absolute radio frequency channel number ARFCN that is of each carrier of N carriers allocated to a receiving end and in each frame of a radio block, where N is a positive integer, and N≥2.

Optionally, manners of acquiring an ARFCN may be different according to a case in which frequency hopping is performed on a carrier and a case in which frequency hopping is not performed on a carrier. For example, for a carrier on which frequency hopping is not performed, an ARFCN is directly designated in an assign message, the ARFCN of the carrier may be directly acquired according to the assign message, and ARFCNs in all frames of the carrier on which frequency hopping is not performed are equal. For a carrier on which frequency hopping is performed, an ARFCN in each frame of the radio block may be calculated according to a frequency parameter in an assign message, where the frequency parameter includes an MA, an HSN, and an MAIO, and a specific algorithm may be an algorithm that is specified in a standard and for calculating an ARFCN by using the frequency parameter and a current frame number FN, for example, may be a frequency hopping algorithm according to the standard protocol 3GPP TS 45.005. Details are not described herein again.

A quantity of the foregoing MAs may be greater than or equal to 2, that is, in this embodiment of the disclosure, the method may be applied to a case of one MA, or may be applied to a case of multiple MAs. For example, if the assign message carries two groups of frequency resource parameters, where a first group of frequency resource parameters is: MA1={1, 7, 13, 19, 25}, HSN1=10, and MAIO1={0, 1, 3, 4}, and a second group of frequency resource parameters is: MA2={3, 9, 15, 21, 27}, HSN2=10, and MAIO2={2, 3, 5}, then all carriers corresponding to the two groups of frequency resource parameters may be used as the N carriers in step 201. An execution process in the case of multiple MAs is the same as that in the case of one MA, and implementation of the objective of the present application is not affected. Therefore, this embodiment of the disclosure sets no limitation on the quantity of the MAs.

202. Respectively select, from the N carriers, a different carrier as an anchor carrier, and search within a search range of the anchor carrier according to the ARFCN of each carrier in each frame of the radio block and a maximum carrier frequency spacing supported by the receiving end, to determine a carrier set of the anchor carrier.

Optionally, the selecting, from the N carriers, a different carrier as an anchor carrier may be performed in any one of the following manners.

Manner 1: Each carrier of the N carriers is used as the anchor carrier.

In manner 1, each carrier is used as the anchor carrier for one search, and an order in which the carriers are used as the anchor carriers may change, provided that it is ensured that each carrier is used as the anchor carrier for one search. A quantity of searches in this manner is relatively large, and carrier selection performance is relatively desirable in a single-user scenario.

Manner 2: Each carrier of the N carriers is sequentially used as the anchor carrier according to a preset first direction.

In manner 2, each carrier is used as the anchor carrier for one search, and manner 2 differs from manner 1 in that all the carriers are used as the anchor carriers in a specific order. This embodiment of the disclosure does not set a specific limitation on the preset first direction. For example, the preset first direction may include: an ascending-order direction of carrier IDs of the N carriers; a descending-order direction of carrier IDs of the N carriers; an ascending-order direction of ARFCNs of the N carriers in any frame of the radio block; or a descending-order direction of ARFCNs of the N carriers in any frame of the radio block.

The foregoing carrier ID may be a carrier number configured on a network side, or may be a carrier ID determined after sorting according to a size of an MAIO in an MAIO set. For example, when MAIO={0, 3, 2}, and corresponding carrier numbers configured on the network side are {0, 1, 2}, carrier IDs {0, 1, 2} corresponding to carrier numbers {0, 2, 1} are obtained after sorting is performed in ascending order of the MAIO values.

Manner 3: The first carrier in the preset first direction is selected, from the N carriers, as a first anchor carrier according to the preset first direction; after a search within a search range of the first anchor carrier ends, and a carrier set of the first anchor carrier is determined, a next carrier that is of the N carriers in the preset first direction and adjacent to a carrier at the most front in the preset first direction in the carrier set of the first anchor carrier is determined. If the next carrier is located in front of the first anchor carrier in the preset first direction, the next carrier is used as a second anchor carrier.

A description of the preset first direction is consistent with the description of the preset first direction in manner 2, and details are not described again.

In the foregoing manner 3, a quantity of carriers selected as anchor carriers is reduced, and calculation complexity is significantly decreased.

The search range of the anchor carrier may include all carriers, except the anchor carrier, of the N carriers.

Optionally, for the foregoing manner 2 and manner 3 of selecting the anchor carrier, the search range of the anchor carrier may also be from a next carrier that is of the N carriers in the preset first direction and adjacent to the anchor carrier to the last carrier of the N carriers in the preset first direction, so that the search range of the anchor carrier is narrowed, and complexity is further decreased.

For details about the searching within a search range of the anchor carrier according to the ARFCN of each carrier in each frame of the radio block and a maximum carrier frequency spacing supported by the receiving end, to determine a carrier set of the anchor carrier, reference may be made to an implementation manner in a first implementation scenario and an implementation manner in a second implementation scenario in this embodiment.

203. Select, from the carrier sets of anchor carriers of the N carriers, at least one carrier set as a carrier selection result.

For example, when a single channel is configured for the receiving end, one carrier set that includes a largest quantity of carriers may be selected, from the carrier sets of the anchor carriers of the N carriers, as a carrier selection result of the single channel. When there are at least two carrier sets, each including a largest quantity of carriers, the carrier selection result of the single channel may be determined according to sums of carrier IDs of the carriers included in the at least two carrier sets. For example, a carrier set that has a smallest sum of carrier IDs of the included carriers is selected, or a carrier set that has a largest sum of carrier IDs of the included carriers is selected. In addition, when the anchor carrier is being selected according to the preset first direction, a carrier set that first appears and includes a largest quantity of carriers may also be used as the carrier selection result of the single channel. No limitation is set herein.

When multiple channels are configured for the receiving end, a carrier selection result of each channel of the multiple channels is determined according to a quantity of carriers included in the carrier set of each anchor carrier of the N carriers.

For example, a carrier set that is in the carrier sets of the anchor carriers and includes a largest quantity of carriers is allocated to a first channel, and a carrier set that is in remaining carrier sets and includes a largest quantity of carriers is allocated to a second channel. In addition, when there are at least two carrier sets, each including a largest quantity of carriers, allocation may be performed according to sums of carrier IDs of the included carriers; or, in a case in which the anchor carrier is being selected according to the preset first direction, allocation may be performed in an order in which the carrier sets appear. For example, a carrier set that first appears and includes a largest quantity of carriers is allocated to the first channel. Details are not described again.

For another example, if there are at least two carrier sets that are in the carrier sets of the anchor carriers of the N carriers and include a largest and same quantity of carriers, for a receiving end configured with dual receive channels, two carrier sets that each have a smallest sum of carrier IDs of the included carriers and include a largest quantity of carriers are selected as the carrier selection result; or if there are not at least two carrier sets that include a largest and same quantity of carriers, a carrier set that includes a largest quantity of carriers and a carrier set that includes a second largest quantity of carriers are selected as the carrier selection result.

Figure 3A:
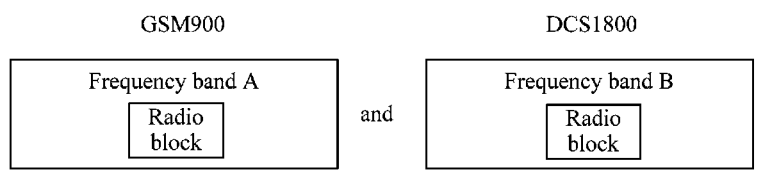
FIG. 3A and FIG. 3B are schematic diagrams of different configurations of a receiving end according to an embodiment of the disclosure.

Optionally, for different channel configurations of the receiving end, a search manner in step 202 may be flexibly used. For example, for a receiving end configured with a single channel, one search is directly performed in the search manner in step 202. For a receiving end configured with multiple channels and supporting contiguous reception on multiple frequency bands, which is also referred to as inter-band reception, referring to FIG. 3A, for carrier allocation scenarios with different MAs, there is only a need to separately perform carrier selection by executing step 202, to obtain carrier set results of different frequency bands. For example, if MA1={1, 10, 19, 28, 37, 46}, which belongs to a frequency band 1, and MA2={512, 521, 530, 539, 548}, which belongs to a frequency band 2 (where frequency channel numbers 1 to 124 belong to the frequency band 1, and frequency channel numbers 512 to 885 belong to the frequency band 2), for allocated carriers corresponding to different MAs, tables of ARFCNs on different frequency bands are separately listed, searches are separately performed by executing step 202, to acquire carrier sets obtained after searching on each frequency band, and one carrier set is selected, from the carrier sets on each frequency band, as a final carrier set result.

This embodiment of the disclosure provides a carrier selection method for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end. And one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

Optionally, in the first implementation scenario, the searching within a search range of the anchor carrier according to the ARFCN of each carrier in each frame of the radio block and a maximum carrier frequency spacing supported by the receiving end, to determine a carrier set of the anchor carrier in step 202 includes: selecting, according to a preset search direction, a first carrier from a carrier that is not searched within the search range of the anchor carrier, and calculating a difference between a largest ARFCN and a smallest ARFCN of ARFCNs that are of the first carrier and all carriers in a first set of the anchor carrier and in each frame of the radio block. Then if the difference between the largest ARFCN and the smallest ARFCN of the ARFCNs that are of the first carrier and all the carriers in the first set and in any frame of the radio block is greater than the maximum carrier frequency spacing supported by the receiving end, ending the search within the search range of the anchor carrier, and using the first set as the carrier set of the anchor carrier. Or if the difference between the largest ARFCN and the smallest ARFCN of the ARFCNs that are of the first carrier and all the carriers in the first set and in each frame of the radio block is not greater than the maximum carrier frequency spacing supported by the receiving end, adding the first carrier to the first set.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

The preset search direction may be any one of the following: an ascending-order direction of carrier IDs of all carriers within the search range of the anchor carrier; a descending-order direction of carrier IDs of all carriers within the search range of the anchor carrier; an ascending-order direction of ARFCNs that are of all carriers within the search range of the anchor carrier and in any frame of the radio block; a descending-order direction of ARFCNs that are of all carriers within the search range of the anchor carrier and in any frame of the radio block; and a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and 1<i<N.

The $i^{th}$ carrier may be the $i^{th}$ carrier obtained after sorting according to carrier IDs, or may be the $i^{th}$ carrier obtained after sorting according to ARFCNs, which is not limited herein.

In the foregoing first implementation scenario, when a search is being performed within a search range of an anchor carrier, a search end flag is that a difference between a largest ARFCN and a smallest ARFCN in any frame is greater than the maximum carrier frequency spacing supported by the receiving end. Therefore, a carrier within the search range of the anchor carrier cannot always be obtained by searching, and a search process is simple.

Optionally, in the second implementation scenario, the searching within a search range of the anchor carrier according to the ARFCN of each carrier in each frame of the radio block and a maximum carrier frequency spacing supported by the receiving end, to determine a carrier set of the anchor carrier in step 202 includes:

selecting a first carrier from a carrier that is not searched within the search range of the anchor carrier, and calculating a difference between a largest ARFCN and a smallest ARFCN of ARFCNs that are of the first carrier and all carriers in a first set of the anchor carrier and in each frame of the radio block;

if the difference between the largest ARFCN and the smallest ARFCN of the ARFCNs that are of the first carrier and all the carriers in the first set and in each frame of the radio block is not greater than the maximum carrier frequency spacing supported by the receiving end, adding the selected first carrier to the first set; and determining whether there is a carrier that is not searched within the search range of the anchor carrier; and if it is determined that there is a carrier that is not searched within the search range of the anchor carrier, selecting a second carrier from the carrier that is not searched within the search range of the anchor carrier; or if it is determined that there is no carrier that is not searched within the search range of the anchor carrier, ending the search within the search range of the anchor carrier, and using the first set as the carrier set of the anchor carrier.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In the foregoing second implementation scenario, when a search is being performed within a search range of an anchor carrier, if a difference between a largest ARFCN and a smallest ARFCN in any frame is greater than the maximum carrier frequency spacing supported by the receiving end, the search performed for the anchor carrier does not end, and instead, a next carrier is further selected for calculation from a carrier that is not searched within the search range of the anchor carrier. Therefore, the carrier within the search range of the anchor carrier can be obtained by searching. A search process is more complex than the search process in the first implementation manner; however, in a single-user scenario, obtained carrier selection performance is more desirable than performance in the foregoing first implementation manner.

Optionally, in a third implementation scenario, when multiple channels are configured for the receiving end, the selecting, from the carrier sets of anchor carriers of the N carriers, at least one carrier set as a carrier selection result in step 203 may specifically include selecting, from the carrier sets of the anchor carriers, one carrier set as a carrier selection result of a first channel of the multiple channels.

After step 203, the method further includes:
- obtaining M carriers by excluding the carrier in the carrier selection result of the first channel from the N carriers;
- respectively selecting, from the M carriers, a different carrier as an anchor carrier, determining a first search range of the anchor carrier in the M carriers, searching within the first search range of the anchor carrier according to ARFCNs of the M carriers in each frame of the radio block and the maximum carrier frequency spacing supported by the receiving end, and determining a first carrier set of the anchor carrier; and
- selecting, from the first carrier sets of the anchor carriers of the M carriers, one carrier set as a carrier selection result of a second channel of the multiple channels.

For the receiving end for which the multiple channels are configured, if the receiving end performs non-contiguous reception on one frequency band by using the multiple channels, one search is performed on the frequency band according to step 202, and carrier sets whose quantity is the same as that of receive channels are selected, or multiple searches are performed according to a quantity of receive channels.

Figure 3B:
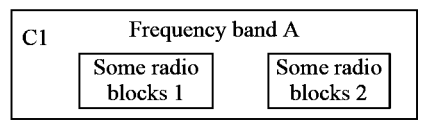
Figure 3B:
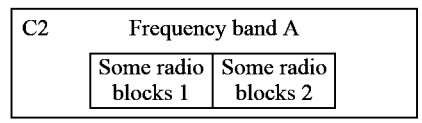
Figure 3B:
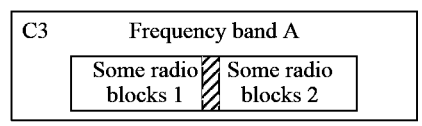

For example, referring to FIG. 3B, a receiving end is configured with dual channels, and performs non-contiguous reception on one frequency band (where a GSM900 frequency band is used as an example in the figure), which is also referred to as intra-band non-contiguous reception. The following carrier selection method may be used.

Multiple searches are performed, and one carrier set is selected, from carrier sets that are of anchor carriers and obtained after each search, as a carrier selection result of one channel of multiple channels.

After the first search ends, a carrier selection result is excluded from an initial carrier set of the second carrier search.

For example, if allocated carrier IDs are 1 to 6, and carriers involved in the first search include all the carriers, that is, a carrier 1 to a carrier 6, a search result of the first search is {carrier 1, carrier 2}, which is used as a carrier selection result of the first receive channel. For the second search, the carrier 1 and the carrier 2 are excluded from allocated carrier sets, and the search is performed only for the carrier 3 to the carrier 6, and a search result of the second search is used as a carrier selection result of the second receive channel.

The following gives a detailed description of the method embodiment shown in FIG. 2 by using several specific embodiments.

Embodiment 1

Figure 4:
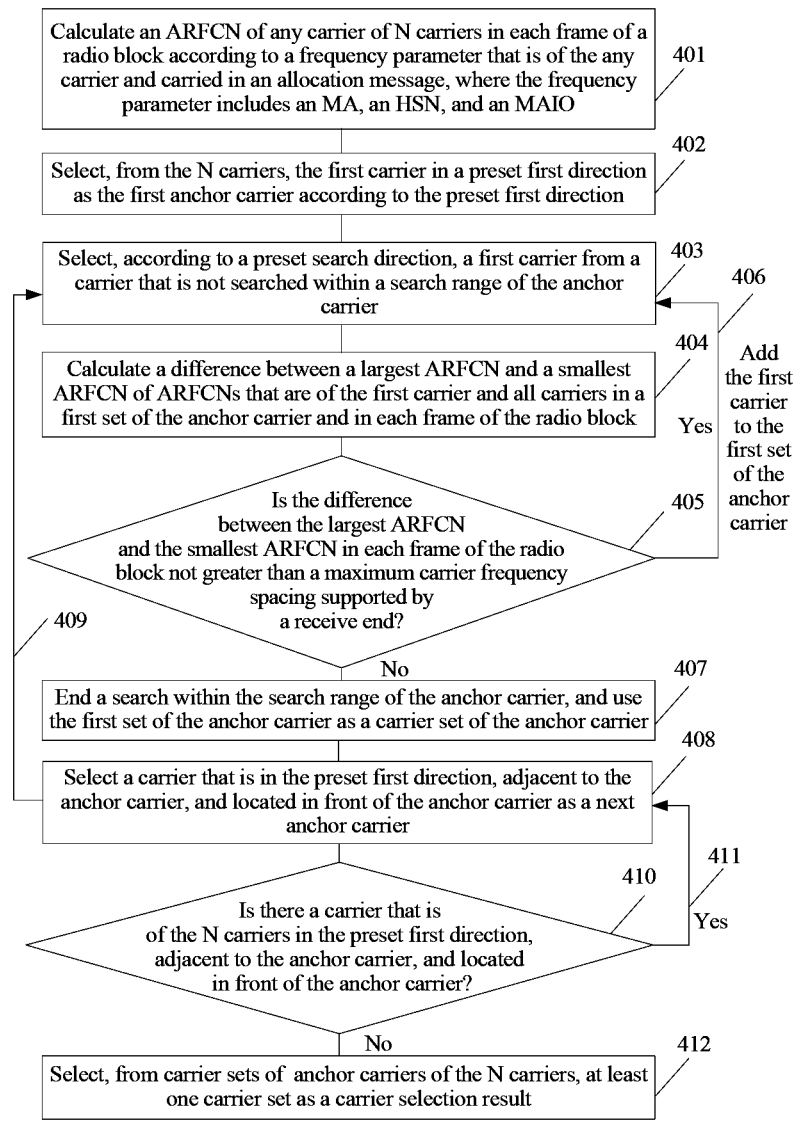
FIG. 4 is a flowchart of another carrier selection method for multicarrier according to an embodiment of the disclosure.

Referring to FIG. 4, FIG. 4 shows another carrier selection method for multicarrier according to an embodiment of the disclosure. The method may include the following steps:

401. Calculate an ARFCN of any carrier of N carriers in each frame of a radio block according to a frequency parameter that is of the any carrier and carried in an assign message, where the frequency parameter includes an MA, an HSN, and an MAIO.

For example, an MA allocated by a network to a terminal is {1, 10, 19, 28, 37, 46, 55, 64, 73, 82}, a spacing between ARFCNs is 9, an HSN allocated by the network to the terminal is 10, a carrier (indicated by MAIOs) set is {0, 2, 3, 4, 6, 7}, and a maximum carrier frequency spacing supported by a receiving end is 25. All carriers are numbered. It should be noted that there is no strong association between a carrier ID and an MAIO value, that is, a carrier corresponding to any MAIO value may be numbered as a carrier 1, which is the same for a correspondence between another carrier ID and an MAIO. For ease of description, carriers whose MAIOs are sequentially 0, 2, 3, 4, 6, and 7 are numbered herein as a carrier 1, a carrier 2, a carrier 3, a carrier 4, a carrier 5, and a carrier 6.

Calculated ARFCNs of all the carriers in each frame of the radio block are shown in Table 1.

TABLE 1

| FN | ARFCN of a carrier 1 | ARFCN of a carrier 2 | ARFCN of a carrier 3 | ARFCN of a carrier 4 | ARFCN of a carrier 5 | ARFCN of a carrier 6 |
|---|---|---|---|---|---|---|
| 1 | 1 | 19 | 28 | 37 | 55 | 64 |
| 2 | 10 | 28 | 37 | 46 | 64 | 73 |
| 3 | 28 | 46 | 55 | 64 | 82 | 1 |
| 4 | 37 | 55 | 64 | 73 | 1 | 10 |

402. Select, from the N carriers, the first carrier in a preset first direction as the first anchor carrier according to the preset first direction.

In this embodiment, selection of an anchor carrier is performed in manner 2 in the method embodiment shown in FIG. 2, that is, all carriers of the N (N=6) carriers are sequentially used as the anchor carriers according to the preset first direction. The preset first direction may include
- an ascending-order direction of carrier IDs of the N (N=6) carriers, that is, a direction of the carrier 1→the carrier 2→the carrier 3→the carrier 4→the carrier 5→the carrier 6; or
- a descending-order direction of carrier IDs of the N (N=6) carriers, that is, a direction of the carrier 6→the carrier 5→the carrier 4→the carrier 3→the carrier 2→the carrier 1; or
- an ascending-order direction of ARFCNs of the N (N=6) carriers in any frame of the radio block, where that the six carriers are in a first frame (where reference is made to Table 1, and FN=1) is used as an example for description, it may be learned, with reference to Table 1, that an ascending-order direction of ARFCNs of the six carriers in the first frame is a direction of the carrier 1→the carrier 2→the carrier 3→the carrier 4→the carrier 5→the carrier 6, and because there is only one MA in this embodiment, an ascending-order direction of carrier IDs may be consistent with an ascending-order direction of ARFCNs of the six carriers in any frame of the radio block; or
- a descending-order direction of ARFCNs of the N (N=6) carriers in any frame of the radio block, where that the six carriers are in a first frame (where reference is made to Table 1, and FN=1) is used as an example for description, it may be learned, with reference to Table 1, that a descending-order direction of ARFCNs of the six carriers in the first frame is a direction of the carrier 6→the carrier 5→the carrier 4→the carrier 3→the carrier 2→the carrier 1, and because there is only one MA in this embodiment, an ascending-order direction of carrier IDs may be consistent with an ascending-order direction of ARFCNs of the six carriers in any frame of the radio block.

In this embodiment, the preset first direction is specifically the ascending-order direction of the carrier IDs of the N (N=6) carriers, that is, the carrier 1, the carrier 2, the carrier 3, the carrier 4, the carrier 5, and the carrier 6 are separately sequentially used as the anchor carriers.

In this embodiment, the carrier 1 is first selected as the anchor carrier.

403. Select, according to a preset search direction, a first carrier from a carrier that is not searched within a search range of the anchor carrier.

The search range of the anchor carrier may be from a next carrier that is of the N carriers in the preset first direction and adjacent to the anchor carrier to the last carrier of the N carriers in the preset first direction.

For example, when the carrier 1 is used as the anchor carrier for a search, a search range corresponding to the carrier 1 includes the carrier 2, the carrier 3, the carrier 4, the carrier 5, and the carrier 6; when the carrier 2 is used as the anchor carrier for a search, a search range corresponding to the carrier 2 includes the carrier 3, the carrier 4, the carrier 5, and the carrier 6; when the carrier 3 is used as the anchor carrier for a search, a search range corresponding to the carrier 3 includes the carrier 4, the carrier 5, and the carrier 6; a search range of another anchor carrier is obtained by analog.

The search range of the anchor carrier may also be all carriers, except the anchor carrier, of the N carriers.

For example, when the carrier 1 is used as the anchor carrier for a search, a search range corresponding to the carrier 1 includes the carrier 2, the carrier 3, the carrier 4, the carrier 5, and the carrier 6. When the carrier 2 is used as the anchor carrier for a search, a search range corresponding to the carrier 2 includes the carrier 3, the carrier 4, the carrier 5, the carrier 6, and the carrier 1. When the carrier 3 is used as the anchor carrier for a search, a search range corresponding to the carrier 3 includes the carrier 4, the carrier 5, the carrier 6, the carrier 1, and the carrier 2. A search range of another anchor carrier is obtained by analog.

Optionally, the preset search direction may be any one of the following:

a. An ascending-order direction of carrier IDs of all carriers within the search range of the anchor carrier, where the six carriers shown in Table 1 are used as an example for description; for example, if the search range corresponding to the carrier 3 includes the carrier 4, the carrier 5, and the carrier 6, when a search is being performed within the search range corresponding to the carrier 3, the preset search direction is a direction of the carrier 4→the carrier 5→the carrier 6, and if a search range corresponding to the carrier 4 includes the carrier 5, the carrier 6, the carrier 1, the carrier 2, and the carrier 3, when a search is being performed within the search range corresponding to the carrier 4, the preset search range is a direction of the carrier 5→the carrier 6.

b. A descending-order direction of carrier IDs of all carriers within the search range of the anchor carrier, where the six carriers shown in Table 1 are used as an example for description; for example, if the search range corresponding to the carrier 3 includes the carrier 2 and the carrier 1, when a search is being performed within the search range corresponding to the carrier 3, the preset search direction is a direction of the carrier 2→the carrier 1, and if a search range corresponding to the carrier 4 includes the carrier 3, the carrier 2, the carrier 1, the carrier 6, and the carrier 5, when a search is being performed within the search range corresponding to the carrier 4, the preset search range is a direction of the carrier 3→carrier 2→the carrier 1.

c. An ascending-order direction of ARFCNs that are of all carriers within the search range of the anchor carrier and in any frame of the radio block, where a principle and an implementation manner are similar to those of manner a, and details are not described herein again.

d. A descending-order direction of ARFCNs that are of all carriers within the search range of the anchor carrier and in any frame of the radio block, where A principle and an implementation manner are similar to those of manner b, and details are not described herein again.

e. A direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and $1<i<N$.

For example, when the carrier 2 is used as the anchor carrier for a search, and the search range corresponding to the carrier 2 includes the carrier 3, the carrier 4, the carrier 5, the carrier 6, and the carrier 1, the preset search direction is the carrier 3→carrier 4→the carrier 5→carrier 6→the carrier 1.

The $i^{th}$ carrier may be specifically the $i^{th}$ carrier obtained after sorting according to carrier IDs, or may be the $i^{th}$ carrier obtained after sorting according to ARFCNs.

In this embodiment, the search range of the anchor carrier is the next carrier that is of the N carriers in the preset first direction and adjacent to the anchor carrier to the last carrier of the N carriers in the preset first direction, that is, the first carrier is sequentially selected, according to an ascending-order direction of the carrier IDs, from carriers that are not searched within the search range (including the carrier 2, the carrier 3, the carrier 4, the carrier 5, and the carrier 6) of the anchor carrier (the carrier 1). Therefore, the carrier 2 is first selected as the first carrier.

404. Calculate a difference between a largest ARFCN and a smallest ARFCN of ARFCNs that are of the first carrier and all carriers in a first set of the anchor carrier and in each frame of the radio block.

The foregoing first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In an initial state, the first set of the anchor carrier (the carrier 1) includes only the anchor carrier (the carrier 1), and a calculation result may be shown in Table 2.

TABLE 2

| | ANCHOR = Carrier 1 | | | |
|---|---|---|---|---|
| FN | ARFCN of the carrier 1 | MIN (ARFCN) | MAX (ARFCN) | DELTA (ARFCN) |
| 0 | 1 | 1 | 1 | 0 |
| 1 | 10 | 10 | 10 | 0 |
| 2 | 28 | 28 | 28 | 0 |
| 3 | 37 | 37 | 37 | 0 |

"ANCHOR" indicates an anchor carrier, "MIN" indicates a smallest ARFCN corresponding to an FN, "MAX" indicates a largest ARFCN corresponding to the FN, and "DELTA" indicates a difference between the largest ARFCN and the smallest ARFCN corresponding to the FN.

It should be noted that in a case in which there is only the anchor carrier in the first set of the anchor carrier, no calculation is needed in practice because a single carrier can meet a requirement of a receiving bandwidth. Herein, Table 2 is merely used to describe an implementation principle of the disclosure more clearly.

Then, the difference between the largest ARFCN and the smallest ARFCN of the ARFCNs that are of the first carrier (the carrier 2 in this case) and all the carriers in the first set ({carrier 1} in this case) of the anchor carrier and in each frame of the radio block is calculated. A calculation result is shown in Table 3.

TABLE 3

| | ANCHOR = Carrier 1 | | | | |
|---|---|---|---|---|---|
| FN | ARFCN of the carrier 1 | ARFCN of a carrier 2 | MIN (ARFCN) | MAX (ARFCN) | DELTA (ARFCN) |
| 0 | 1 | 19 | 1 | 19 | 18 |
| 1 | 10 | 28 | 10 | 28 | 18 |
| 2 | 28 | 46 | 28 | 46 | 18 |
| 3 | 37 | 55 | 37 | 55 | 18 |

405. Determine whether the difference between a largest ARFCN and a smallest ARFCN in each frame of the radio block is not greater than a maximum carrier frequency spacing supported by the receiving end. If the difference between the largest ARFCN and the smallest ARFCN in each frame of the radio block is not greater than the maximum carrier frequency spacing supported by the receiving end, execute step 406. If the difference between the largest ARFCN and the smallest ARFCN in each frame of the radio block is greater than the maximum carrier frequency spacing supported by the receiving end, execute step 407.

For example, according to the calculation result of step 404, when the first carrier is the carrier 2, and the first set of the anchor carrier includes only the carrier 1, a difference between a largest ARFCN and a smallest ARFCN of ARFCNs in each frame of four frames is 18, which is less than the bandwidth 25 of the receiving end, and step 406 is executed.

406. Add the first carrier to the first set of the anchor carrier, and repeat step 403 to step 405.

The first carrier (the carrier 2) is added to the first set of the anchor carrier, and in this case, the first set of the anchor carrier is {carrier 1, carrier 2}. The carrier 3 is further selected as the first carrier, and a difference between a largest ARFCN and a smallest ARFCN of ARFCNs that are of the carrier 3 and all carriers in the first set {carrier 1, carrier 2} of the anchor carrier and in each frame of the radio block is calculated. A calculation result is shown in Table 4.

TABLE 4

| | ANCHOR = Carrier 1 | | | | |
|---|---|---|---|---|---|
| FN | ARFCN of the carrier 1 | ARFCN of a carrier 2 | ARFCN of a carrier 3 | MIN (ARFCN) | MAX (ARFCN) | DELTA (ARFCN) |
| 0 | 1 | 19 | 28 | 1 | 28 | 27 |
| 1 | 10 | 28 | 37 | 10 | 37 | 27 |

TABLE 4-continued

| | ANCHOR = Carrier 1 | | | | |
|---|---|---|---|---|---|
| FN | ARFCN of the carrier 1 | ARFCN of a carrier 2 | ARFCN of a carrier 3 | MIN (ARFCN) | MAX (ARFCN) | DELTA (ARFCN) |
| 2 | 28 | 46 | 55 | 28 | 55 | 27 |
| 3 | 37 | 55 | 64 | 37 | 64 | 27 |

For example, when the first carrier is the carrier 3, and the first set of the anchor carrier is {carrier 1, carrier 2}, a difference between a largest ARFCN and a smallest ARFCN of ARFCNs in each frame of the four frames is 27, which is greater than the bandwidth 25 of the receiving end, step 407 is executed.

407. End a search within the search range of the anchor carrier, and use the first set of the anchor carrier as a carrier set of the anchor carrier.

According to step 406, when the first carrier is the carrier 3, the difference between the largest ARFCN and the smallest ARFCN of the ARFCNs in each frame of the four frames is greater than the bandwidth 25 of the receiving end; therefore, the search within the search range of the anchor carrier (the carrier 1) ends, and the first set of the anchor carrier is used as the carrier set of the anchor carrier to obtain the carrier set {carrier 1, carrier 2} corresponding to the anchor carrier 1.

408. Select a carrier that is in the preset first direction, adjacent to the anchor carrier, and located in front of the anchor carrier as a next anchor carrier.

For example, when the current anchor carrier is the carrier 1, the carrier 2 is used as the next anchor carrier.

409. Repeat step 403 to step 408 to determine a carrier set of the next anchor carrier.

For example, according to step 403 to step 408, it is learned that the carrier set of the anchor carrier is {carrier 2, carrier 3, carrier 4} when the carrier 2 is the anchor carrier, and the carrier set of anchor carrier is {carrier 6} when the carrier 6 is the anchor carrier.

410. Determine whether there is a carrier that is of the N carriers in the preset first direction, adjacent to the anchor carrier, and located in front of the anchor carrier. If there is a carrier that is of the N carriers in the preset first direction, adjacent to the anchor carrier, and located in front of the anchor carrier, execute step 411. If there is no carrier that is of the N carriers in the preset first direction, adjacent to the anchor carrier, and located in front of the anchor carrier, execute step 412.

411. Repeat step 408 to step 410 to determine a carrier set of each anchor carrier.

412. Select, from the carrier sets of anchor carriers of the N carriers, at least one carrier set as a carrier selection result.

A carrier set that includes a largest quantity of carriers may be selected as the carrier selection result. According to a result of step 409, the final carrier selection result is {carrier 2, carrier 3, carrier 4}.

This embodiment of the disclosure provides a carrier selection method for multicarrier. Different carriers are selected as anchor carriers, carrier sets of all anchor carriers are sequentially determined according to an ARFCN of each carrier in each frame of a radio block and a maximum carrier frequency spacing supported by a receiving end, and one or more carrier sets are selected, from the carrier sets of all the anchor carriers, as a carrier selection result, implementing that an optimal carrier combination is obtained by searching by using a method with relatively low complexity, which overcomes a defect, in the prior art, that complexity of a brute force method is extremely high.

Embodiment 2

Figure 5:
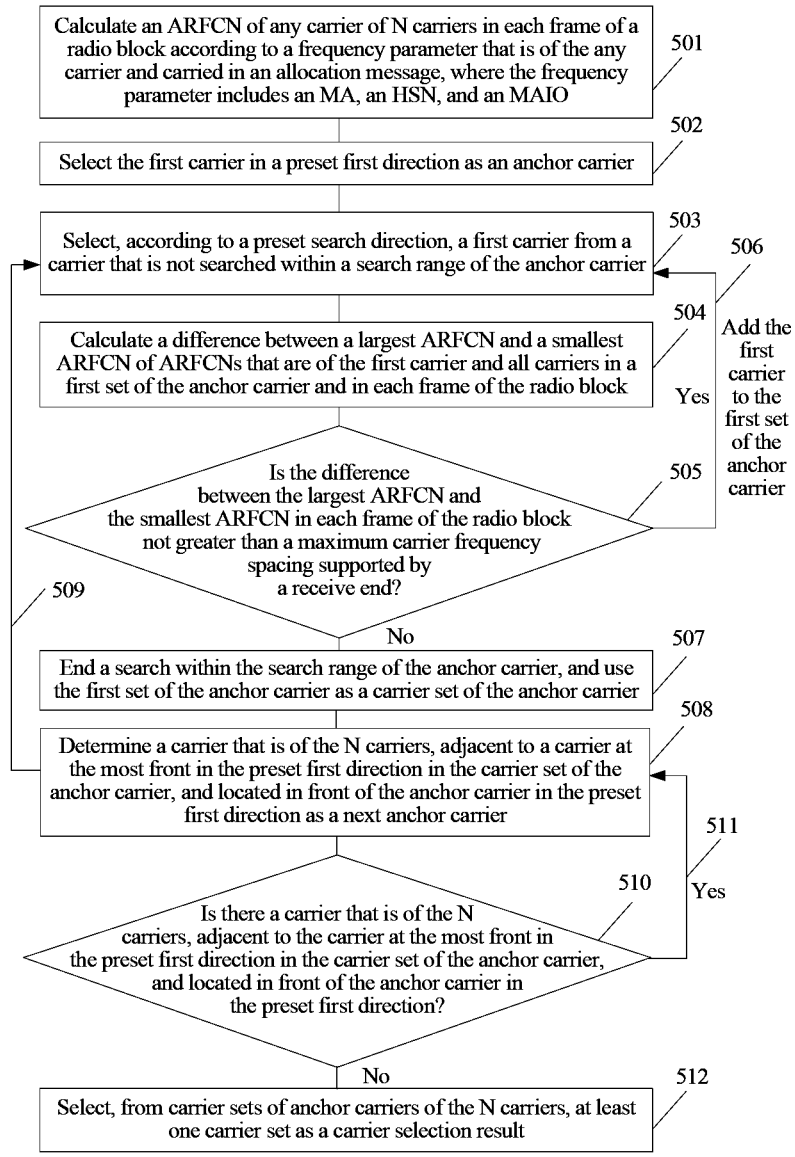
FIG. 5 is a flowchart of another carrier selection method for multicarrier according to an embodiment of the disclosure.

Referring to FIG. 5, FIG. 5 shows another carrier selection method for multicarrier according to an embodiment of the disclosure. The method may include the following steps:

501. Calculate an ARFCN of any carrier of N carriers in each frame of a radio block according to a frequency parameter that is of the any carrier and carried in an assign message, where the frequency parameter includes an MA, an HSN, and an MAIO.

Exemplary parameters in this embodiment are the same as those in Embodiment 1.

502. Select the first carrier in a preset first direction as an anchor carrier.

For example, if the preset first direction is an ascending-order direction of carrier IDs of the N (N=6) carriers, that is, a direction of a carrier 1→a carrier 2→a carrier 3→a carrier 4→a carrier 5→a carrier 6, the carrier 1 is selected as the anchor carrier.

503. Select, according to a preset search direction, a first carrier from a carrier that is not searched within a search range of the anchor carrier.

For the search range of the anchor carrier, refer to related descriptions in step 402.

If in this embodiment, the preset search direction is direction a in Embodiment 1, the first carrier is sequentially selected, according to an ascending-order direction of the carrier IDs, from carriers that are not searched within the search range (including the carrier 2, the carrier 3, the carrier 4, the carrier 5, and the carrier 6) of the anchor carrier (the carrier 1). Therefore, the carrier 2 is first selected as the first carrier.

504. Calculate a difference between a largest ARFCN and a smallest ARFCN of ARFCNs that are of the first carrier and all carriers in a first set of the anchor carrier and in each frame of the radio block.

First, when the first set of the anchor carrier (the carrier 1) includes the carrier 1 in an initial state, a calculation result is the same as that in Embodiment 1, and may be shown in Table 2. Then, a difference between a largest ARFCN and a smallest ARFCN of ARFCNs that are of the first carrier (the carrier 2 in this case) and the first set ({carrier 1} in this case) of the anchor carrier and in each frame of the radio block is calculated, and a calculation result is shown in Table 3.

505. Determine whether the difference between the largest ARFCN and the smallest ARFCN in each frame of the radio block is not greater than a maximum carrier frequency spacing supported by the receiving end. If the difference between the largest ARFCN and the smallest ARFCN in each frame of the radio block is not greater than the maximum carrier frequency spacing supported by the receiving end, execute step 506. If the difference between the largest ARFCN and the smallest ARFCN in each frame of the radio block is greater than the maximum carrier frequency spacing supported by the receiving end, execute step 507.

For example, according to the calculation result of step 504, when the first carrier is the carrier 2, and the first set of the anchor carrier includes only the carrier 1, a difference between a largest ARFCN and a smallest ARFCN of ARFCNs in each frame of four frames is 18, which is less than a bandwidth 25 of the receiving end.

506. Add the first carrier to the first set of the anchor carrier, and repeat step 503 to step 505.

According to step 505, when the first carrier is the carrier 2, the difference between the largest ARFCN and the smallest ARFCN of the ARFCNs in each frame of the four frames is less than the bandwidth 25 of the receiving end; therefore, the first carrier (the carrier 2) is added to the first set of the anchor carrier, and in this case, the first set of the anchor carrier is {carrier 1, carrier 2}.

The carrier 3 is further selected as the first carrier, and a difference between a largest ARFCN and a smallest ARFCN of ARFCNs that are of the carrier 3 and all carriers in the first set {carrier 1, carrier 2} of the anchor carrier and in each frame of the radio block is calculated. A calculation result is shown in Table 4.

507. End a search within the search range of the anchor carrier, and use the first set of the anchor carrier as a carrier set of the anchor carrier.

In this embodiment, according to the calculation result of step 506, when the first carrier is the carrier 3, the difference between the largest ARFCN and the smallest ARFCN of the ARFCNs in each frame of the four frames is greater than the bandwidth 25 of the receiving end; therefore, the search within the search range of the anchor carrier (the carrier 1) ends, and the first set of the anchor carrier is used as the carrier set of the anchor carrier to obtain the carrier set {carrier 1, carrier 2} of the anchor carrier 1.

508. Determine a carrier that is of the N carriers, adjacent to a carrier at the most front in the preset first direction in the carrier set of the anchor carrier, and located in front of the anchor carrier in the preset first direction as a next anchor carrier.

According to step 507, the preset first direction is a direction of the carrier 1→carrier 2→the carrier 3→carrier 4→the carrier 5→the carrier 6; therefore, a carrier at the most front in the preset first direction in the carrier set {carrier 1, carrier 2} of the anchor carrier 1 is the carrier 2, a next carrier that is in the preset first direction and adjacent to the carrier 2 is the carrier 3, and the carrier 3 is in front of the anchor carrier (the carrier 1) in the preset first direction. Therefore, the carrier 3 is used as the next anchor carrier.

509. Repeat step 503 to step 508 to determine a carrier set of the next anchor carrier.

The parameters provided in Embodiment 1 are used as an example. According to the manner of selecting an anchor carrier in this embodiment, carriers finally selected as anchor carriers include the carrier 1, the carrier 3, the carrier 5, and the carrier 6. By executing step 503 to step 508, the finally acquired carrier set of the anchor carrier is {carrier 1, carrier 2} when the carrier 1 is the anchor carrier, the finally acquired carrier set of the anchor carrier is {carrier 3, carrier 4} when the carrier 3 is the anchor carrier, the finally acquired carrier set of the anchor carrier is {carrier 5, carrier 6} when the carrier 5 is the anchor carrier, and the finally acquired carrier set of the anchor carrier is {carrier 6} when the carrier 6 is the anchor carrier.

510. Determine whether there is a carrier that is of the N carriers, adjacent to the carrier at the most front in the preset first direction in the carrier set of the anchor carrier, and located in front of the anchor carrier in the preset first direction. If there is a carrier that is of the N carriers, adjacent to the carrier at the most front in the preset first direction in the carrier set of the anchor carrier, and located in front of the anchor carrier in the preset first direction, execute step 511. If there is no carrier that is of the N carriers, adjacent to the carrier at the most front in the preset first direction in the carrier set of the anchor carrier, and located in front of the anchor carrier in the preset first direction, execute step 512.

511. Repeat step 508 to step 510 to determine a carrier set of each anchor carrier.

512. Select, from the carrier sets of anchor carriers of the N carriers, at least one carrier set as a carrier selection result.

According to step 509, it may be learned that in this embodiment, each carrier is classified into a carrier set of one anchor carrier, carrier sets of all anchor carriers do not include a same carrier, and the carrier sets of the four anchor carriers are respectively {carrier 1, carrier 2}, {carrier 3, carrier 4}, {carrier 5}, and {carrier 6}. A quantity of carriers included in the first carrier set {carrier 1, carrier 2} is the same as a quantity of carriers included in the second carrier set {carrier 3, carrier 4}; therefore, in this case, a selection method may be predefined. For example, if a carrier set that first appears and includes a largest quantity of carriers is selected as a carrier selection result, the final carrier set selection result is the first carrier set {carrier 1, carrier 2}. Certainly, for carrier sets that include a same quantity of carriers, selection may also be performed in another selection manner, for example, a carrier set with a relatively small sum of carrier sequence numbers is selected.

In comparison with the carrier selection result {carrier 1, carrier 2} with the selection result {carrier 2, carrier 3, carrier 4} in Embodiment 1, there is a loss in performance; however, search complexity is decreased.

This embodiment of the disclosure provides a carrier selection method for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

Embodiment 3

Figure 6:
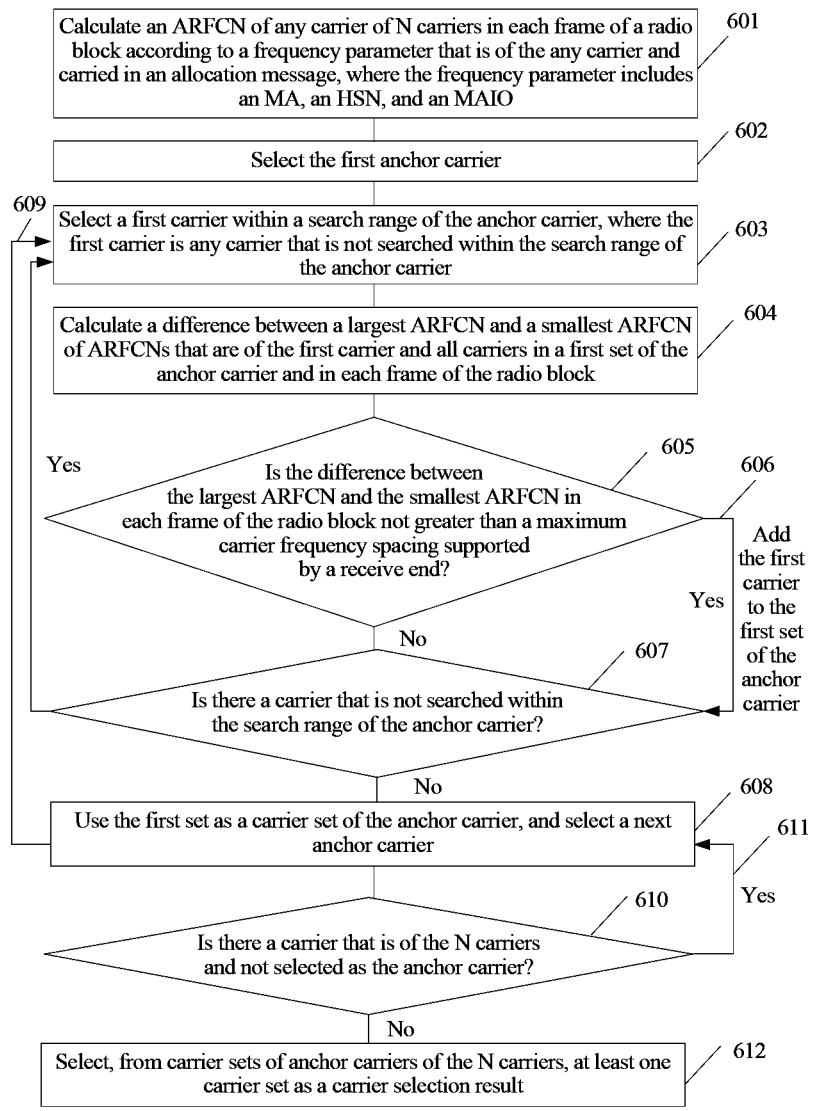
FIG. 6 is a flowchart of another carrier selection method for multicarrier according to an embodiment of the disclosure.

Referring to FIG. 6, FIG. 6 shows another carrier selection method for multicarrier according to an embodiment of the disclosure. The method may include the following steps:

601. Calculate an ARFCN of any carrier of N carriers in each frame of a radio block according to a frequency parameter that is of the any carrier and carried in an assign message, where the frequency parameter includes an MA, an HSN, and an MAIO.

Exemplary parameters in this embodiment are the same as those in Embodiment 1. All the parameters in this embodiment are the same as those in Embodiment 1, and ARFCNs of six carriers in each frame of the radio block are shown in Table 1.

602. Select the first anchor carrier.

The first anchor carrier may be any one of the N carriers, which is not limited in this embodiment of the disclosure. For example, in this embodiment, a carrier 2 is selected as the first anchor carrier.

603. Select a first carrier within a search range of the anchor carrier, where the first carrier is any carrier that is not searched within the search range of the anchor carrier.

In this embodiment, the search range of the anchor carrier is all other carriers except the anchor carrier. For example, when the carrier 2 is used as the anchor carrier for a search, a search range corresponding to the carrier 2 includes a carrier 3, a carrier 4, a carrier 5, a carrier 6, and a carrier 1.

The first carrier is any carrier that is not searched. For example, in an initial state, the carrier 3, the carrier 4, the carrier 5, the carrier 6, and the carrier 1 within the search range corresponding to the carrier 2 are all carriers that are not searched; therefore, the carrier 3, the carrier 4, the carrier 5, the carrier 6, and the carrier 1 may all be used as the first carrier. In this embodiment, that the carrier 4 is first selected is used as an example for description.

604. Calculate a difference between a largest ARFCN and a smallest ARFCN of ARFCNs that are of the first carrier and all carriers in a first set of the anchor carrier and in each frame of the radio block.

In an initial state, the first set of the anchor carrier (the carrier 2) includes only the anchor carrier (the carrier 2), and a calculation result may be shown in Table 5.

TABLE 5

| | ANCHOR = Carrier 2 | | | |
|---|---|---|---|---|
| FN | ARFCN of the carrier 2 | MIN (ARFCN) | MAX (ARFCN) | DELTA (ARFCN) |
| 0 | 19 | 19 | 19 | 0 |
| 1 | 28 | 28 | 28 | 0 |
| 2 | 46 | 46 | 46 | 0 |
| 3 | 55 | 55 | 55 | 0 |

Then, the difference between the largest ARFCN and the smallest ARFCN of the ARFCNs that are of the first carrier (the carrier 4 in this case) and all the carriers in the first set ({carrier 2} in this case) of the anchor carrier and in each frame of the radio block is calculated. A calculation result is shown in Table 6.

TABLE 6

| | ANCHOR = Carrier 2 | | | | |
|---|---|---|---|---|---|
| FN | ARFCN of the carrier 2 | ARFCN of a carrier 4 | MIN (ARFCN) | MAX (ARFCN) | DELTA (ARFCN) |
| 0 | 19 | 37 | 19 | 37 | 18 |
| 1 | 28 | 46 | 28 | 46 | 18 |
| 2 | 46 | 64 | 46 | 64 | 18 |
| 3 | 55 | 73 | 55 | 73 | 18 |

605. Determine whether the difference between the largest ARFCN and the smallest ARFCN in each frame of the radio block is not greater than a maximum carrier frequency spacing supported by the receiving end. If the difference between the largest ARFCN and the smallest ARFCN in each frame of the radio block is not greater than the maximum carrier frequency spacing supported by the receiving end, execute step 606. If the difference between the largest ARFCN and the smallest ARFCN in each frame of the radio block is greater than the maximum carrier frequency spacing supported by the receiving end, execute step 607.

For example, according to the calculation result of step 604, when the first carrier is the carrier 4, and the first set of the anchor carrier includes only the carrier 2, a difference between a largest ARFCN and a smallest ARFCN of ARFCNs in each frame of four frames is 18, which is less than a bandwidth 25 of the receiving end.

606. Add the first carrier to the first set of the anchor carrier, and execute step 607.

According to step 605, when the first carrier is the carrier 4, the difference between the largest ARFCN and the smallest ARFCN of the ARFCNs in each frame of the four frames is less than the bandwidth 25 of the receiving end; therefore, the first carrier (the carrier 4) is added to the first set of the anchor carrier (the carrier 2), and in this case, the first set of the anchor carrier is {carrier 2, carrier 4}.

607. Determine whether there is a carrier that is not searched within the search range of the anchor carrier. If there is a carrier that is not searched within the search range of the anchor carrier, repeat step 603 to step 607. If there is no carrier that is not searched within the search range of the anchor carrier, execute step 608.

After the first carrier is added to the first set of the anchor carrier, or a result of the determining of step 605 is that the difference between the largest ARFCN and the smallest ARFCN in each frame of the radio block is greater than the maximum carrier frequency spacing supported by the receiving end, it is determined whether there is a carrier that is not searched within the search range of the anchor carrier.

If there is a carrier that is not searched within the search range of the anchor carrier, the first carrier is further selected. The carrier 4 is searched; therefore, carriers that are not searched within the search range of the anchor carrier (the carrier 2) are the carrier 3, the carrier 5, the carrier 6, and the carrier 1. Likewise, any one of the carrier 3, the carrier 5, the carrier 6, and the carrier 1 may be selected as the first carrier. In this embodiment, that the carrier 5 is selected is used as an example for description.

A difference between a largest ARFCN and a smallest ARFCN of ARFCNs that are of the carrier 5 and all carriers in the first set {carrier 2, carrier 4} of the anchor carrier and in each frame of the radio block is calculated. A calculation result is shown in Table 7.

TABLE 7

| | ANCHOR = Carrier 1 | | | | |
|---|---|---|---|---|---|
| FN | ARFCN of a carrier 2 | ARFCN of a carrier 4 | ARFCN of a carrier 5 | MIN (ARFCN) | MAX (ARFCN) | DELTA (ARFCN) |
| 0 | 19 | 37 | 55 | 19 | 55 | 36 |
| 1 | 28 | 46 | 64 | 28 | 64 | 36 |
| 2 | 46 | 64 | 82 | 46 | 82 | 36 |
| 3 | 55 | 73 | 1 | 1 | 73 | 72 |

According to Table 7, when the first carrier is the carrier 5, the difference between the largest ARFCN and the smallest ARFCN of the ARFCNs in each frame of the four frames is greater than the bandwidth 25 of the receiving end; therefore, it is determined whether there is a first carrier within the search range of the anchor carrier.

Within the search range corresponding to the anchor carrier (the carrier 2), only the carrier 3 and the carrier 5 are searched, and the carrier 4, the carrier 6, and the carrier 1 are not searched; therefore, it is determined that there is a first carrier within the search range of the anchor carrier (the carrier 2), and step 603 to step 608 is further repeated, that is, any one of the carrier 4, the carrier 6, and the carrier 1 is then selected as the first carrier, and step 603 to step 608 are repeated until one search is performed for each carrier within the search range of the anchor carrier (the carrier 2).

608. Use the first set as a carrier set of the anchor carrier, and select a next anchor carrier.

If there is no first carrier within the search range of the anchor carrier (the carrier 2), it indicates that all carriers within the search range of the anchor carrier (the carrier 2) is searched, the search within the search range of the current anchor carrier (the carrier 2) ends, and the carrier set of the current anchor carrier (the carrier 2), that is, {carrier 2, carrier 3, carrier 4} is obtained.

In this embodiment, the next anchor carrier may be any one of carriers that are not selected as anchor carriers. In this embodiment, anchor carriers may not be sequentially selected, and instead, may be selected in any manner, provided that each anchor carrier is selected once.

609. Repeat step 603 to step 609 to determine a carrier set of the next anchor carrier.

The parameters provided in Embodiment 1 are used as an example. It may be learned that the carrier set of the anchor carrier is {carrier 1, carrier 2} when the carrier 1 is the anchor carrier, the carrier set of the anchor carrier is {carrier 2, carrier 3, carrier 4} when the carrier 2 is the anchor carrier, the carrier set of the anchor carrier is {carrier 3, carrier 4, carrier 2} when the carrier 3 is the anchor carrier, the carrier set of the anchor carrier is {carrier 3, carrier 4, carrier 2} when the carrier 4 is the anchor carrier, the carrier set of the anchor carrier is {carrier 5, carrier 6} when the carrier 5 is the anchor carrier, and the carrier set of the anchor carrier is {carrier 5, carrier 6} when the carrier 6 is the anchor carrier.

610. Determine whether there is a carrier that is of the N carriers and not selected as the anchor carrier; and if it is determined that there is a carrier that is of the N carriers and not selected as the anchor carrier, execute step 611; or if it is determined that there is no carrier that is of the N carriers and not selected as the anchor carrier, execute step 612.

611. Repeat step 609 to step 611 to determine a carrier set of each anchor carrier.

612. Select, from the carrier sets of anchor carriers of the N carriers, at least one carrier set as a carrier selection result.

According to a result of step 610, a carrier set that includes a largest quantity of carriers may be used as the carrier selection result, and then the final carrier selection result is {carrier 3, carrier 4, carrier 2}.

This embodiment of the disclosure provides a carrier selection method for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

Embodiment 4

Figure 7:
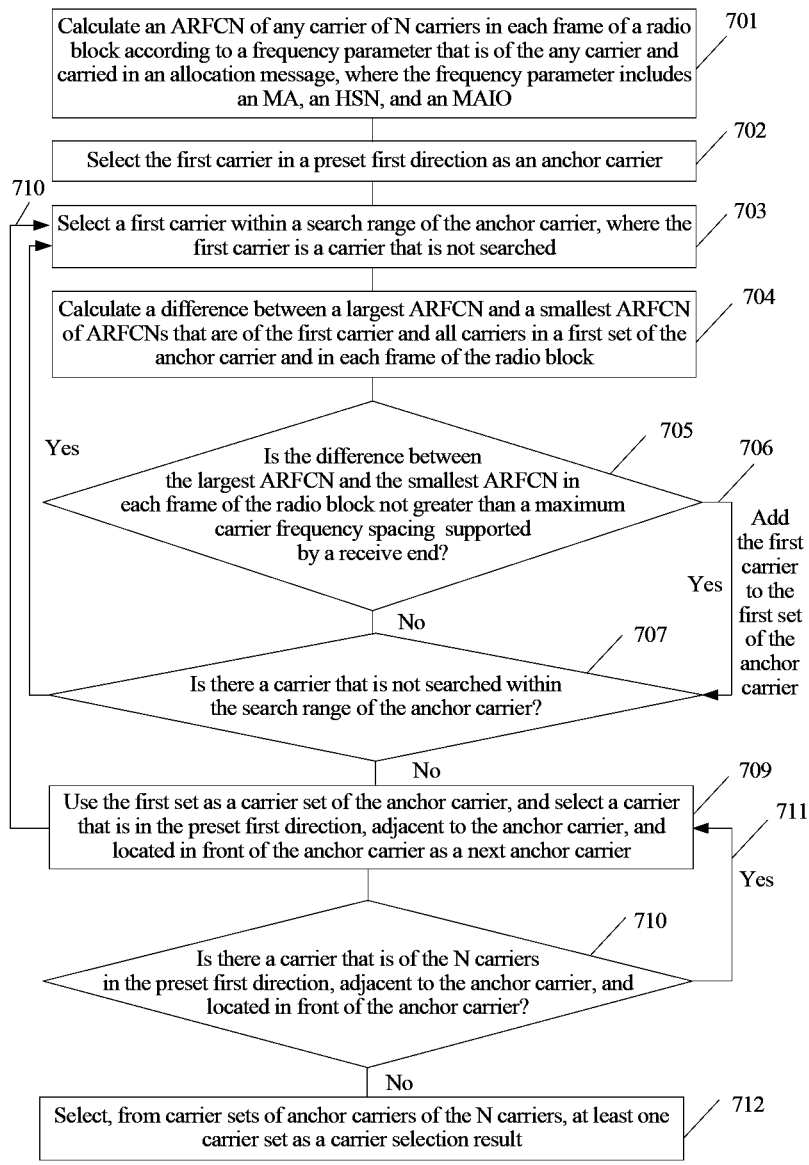
FIG. 7 is a flowchart of another carrier selection method for multicarrier according to an embodiment of the disclosure.

Referring to FIG. 7, FIG. 7 shows another carrier selection method for multicarrier according to an embodiment of the disclosure. A principle of this embodiment is the same as that of Embodiment 1, Embodiment 2, and Embodiment 3. Details are as follows:

701. Calculate an ARFCN of any carrier of N carriers in each frame of a radio block according to a frequency parameter that is of the any carrier and carried in an assign message, where the frequency parameter includes an MA, an HSN, and an MAIO.

All parameters in this embodiment are the same as those in Embodiment 1, and ARFCNs of six carriers in each frame of the radio block are shown in Table 1.

702. Select the first carrier in a preset first direction as an anchor carrier.

A related description of the preset first direction is the same as the description of the preset first direction in Embodiment 1, and specifically, may be an ascending-order direction of carrier IDs, that is, a carrier 1 is first selected as the anchor carrier.

703. Select a first carrier within a search range of the anchor carrier, where the first carrier is a carrier that is not searched.

In this embodiment, the search range of the anchor carrier is a next carrier that is of the six carriers in the preset first direction and adjacent to the anchor carrier to the last carrier of the six carriers in the preset first direction. For example, when a carrier 2 is used as the anchor carrier for a search, a search range corresponding to the carrier 2 includes a carrier 3, a carrier 4, a carrier 5, and a carrier 6, and when the carrier 3 is used as the anchor carrier for a search, a search range corresponding to the carrier 3 includes the carrier 4, the carrier 5, and the carrier 6.

The first carrier is any carrier that is not searched. For example, in an initial state, the carrier 2, the carrier 3, the carrier 4, the carrier 5, and the carrier 6 within a search range corresponding to a carrier 1 are all carriers that are not searched; therefore, the carrier 2, the carrier 3, the carrier 4, the carrier 5, and the carrier 6 may all be used as the first carrier. In this embodiment, that the carrier 3 is first selected is used as an example for description.

704. Calculate a difference between a largest ARFCN and a smallest ARFCN of ARFCNs that are of the first carrier and all carriers in a first set of the anchor carrier and in each frame of the radio block.

In an initial state, the first set of the anchor carrier (the carrier 1) includes only the anchor carrier (the carrier 1), and a calculation result may be shown in Table 2.

Then, the difference between the largest ARFCN and the smallest ARFCN of the ARFCNs that are of the first carrier (the carrier 3 in this case) and all the carriers in the first set ({carrier 1} in this case) of the anchor carrier and in each frame of the radio block is calculated. A calculation result is shown in Table 8.

TABLE 8

| | ANCHOR = Carrier 1 | | | | |
|---|---|---|---|---|---|
| FN | ARFCN of the carrier 1 | ARFCN of a carrier 3 | MIN (ARFCN) | MAX (ARFCN) | DELTA (ARFCN) |
| 0 | 1 | 28 | 1 | 28 | 27 |
| 1 | 10 | 37 | 10 | 37 | 27 |
| 2 | 28 | 55 | 28 | 55 | 27 |
| 3 | 37 | 64 | 37 | 64 | 27 |

705. Determine whether the difference between the largest ARFCN and the smallest ARFCN in each frame of the radio block is not greater than a maximum carrier frequency spacing supported by the receiving end. If the difference between the largest ARFCN and the smallest ARFCN in each frame of the radio block is not greater than the maximum carrier frequency spacing supported by the receiving end, execute step 706. If the difference between the largest ARFCN and the smallest ARFCN in each frame of the radio block is greater than the maximum carrier frequency spacing supported by the receiving end, execute step 707.

For example, according to the calculation result of step 704, when the first carrier is the carrier 3, and the first set of the anchor carrier includes only the carrier 1, a difference between a largest ARFCN and a smallest ARFCN of ARFCNs in each frame of four frames is 27, which is greater than a bandwidth 25 of the receiving end.

706. Add the first carrier to the first set of the anchor carrier.

707. Determine whether there is a carrier that is not searched within the search range of the anchor carrier; and if it is determined that there is a carrier that is not searched within the search range of the anchor carrier, repeat step 703 to step 707; or if it is determined that there is no carrier that is not searched within the search range of the anchor carrier, execute step 708.

After the first carrier is added to the first set of the anchor carrier, or a result of the determining of step 705 is that the difference between the largest ARFCN and the smallest ARFCN in each frame of the radio block is greater than the maximum carrier frequency spacing supported by the receiving end, it is determined whether there is a carrier that is not searched within the search range of the anchor carrier.

If there is a carrier that is not searched within the search range of the anchor carrier, the first carrier is further selected. The carrier 3 is searched; therefore, carriers that are not searched within the search range of the anchor carrier (the carrier 1) are the carrier 2, the carrier 4, the carrier 5, and the carrier 6. Likewise, any one of the carrier 2, the carrier 4, the carrier 5, and the carrier 6 may be selected as the first carrier. In this embodiment, that the carrier 2 is selected is used as an example for description.

A difference between a largest ARFCN and a smallest ARFCN of ARFCNs that are of the carrier 2 and all carriers in the first set {carrier 1} of the anchor carrier and in each frame of the radio block is calculated. A calculation result is shown in Table 3.

According to Table 7, when the first carrier is the carrier 2, a difference between a largest ARFCN and a smallest ARFCN of ARFCNs in each frame of the four frames is less than the bandwidth 25 of the receiving end; therefore, the carrier 2 is added to the first set of the anchor carrier.

It is further determined whether there is a first carrier. Within the search range corresponding to the anchor carrier (the carrier 1), only the carrier 3 and the carrier 2 are searched, and the carrier 4, the carrier 5, and the carrier 6 are not searched; therefore, it is determined that there is a first carrier within the search range of the anchor carrier (the carrier 1), and step 703 to step 708 are further repeated, that is, any one of the carrier 4, the carrier 5, and the carrier 6 is then selected as the first carrier, and step 703 to step 708 are repeated until one search is performed for each carrier within the search range of the anchor carrier (the carrier 1). For example, the obtained carrier set corresponding to the anchor carrier 1 is {carrier 1, carrier 2}.

708. Use the first set as a carrier set of the anchor carrier, and select a carrier that is in the preset first direction, adjacent to the anchor carrier, and located in front of the anchor carrier as a next anchor carrier.

If there is no first carrier within the search range of the anchor carrier, it indicates that all carriers within the search range of the anchor carrier are searched, the search within the search range of the current anchor carrier ends, and the carrier that is in the preset first direction, adjacent to the current anchor carrier, and located in front of the current anchor carrier is selected as the next anchor carrier.

For example, when the search within the search range of the current anchor carrier (the carrier 1) ends, the carrier 2 should be selected as the next anchor carrier.

709. Repeat step 703 to step 709 to determine a carrier set of the next anchor carrier.

The parameters provided in Embodiment 1 are used as an example. The carrier set is {carrier 1, carrier 2} when the carrier 1 is the anchor carrier, the carrier set is {carrier 2, carrier 3, carrier 4} when the carrier 2 is the anchor carrier, the carrier set is {carrier 3, carrier 4} when the carrier 3 is the anchor carrier, the carrier set is {carrier 4} when the carrier 4 is the anchor carrier, the carrier set is {carrier 5} when the carrier 5 is the anchor carrier, and the carrier set is {carrier 6} when the carrier 6 is the anchor carrier.

710. Determine whether there is a carrier that is of the N carriers in the preset first direction, adjacent to the anchor carrier, and located in front of the anchor carrier. If there is a carrier that is of the N carriers in the preset first direction, adjacent to the anchor carrier, and located in front of the anchor carrier, execute step 711. If there is no carrier that is of the N carriers in the preset first direction, adjacent to the anchor carrier, and located in front of the anchor carrier, execute step 712.

711. Repeat step 709 to step 711 to determine a carrier set of each anchor carrier.

712. Select, from the carrier sets of anchor carriers of the N carriers, at least one carrier set as a carrier selection result.

According to a search result of step 707, a carrier set that first appears and includes a largest quantity of carriers may be selected as the carrier selection result, that is, {carrier 2, carrier 3, carrier 4}.

This embodiment of the disclosure provides a carrier selection method for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

Embodiment 5

This embodiment introduces a case to which multiple MA parameters are applied, and specific steps may be the same as those in any one of Embodiment 1 to Embodiment 4. In this embodiment, details are not described again. It should be noted that allocated carrier IDs in different MAs are numbered in a unified manner.

For example, a network allocates multiple MA sets to a terminal. A group of parameters is MA1={1, 7, 13, 19, 25, 31, 37, 43}, HSN1=10, and a carrier (indicated by MAIOs) set MAIOs1={0, 1, 3, 4, 6, 7}. Another group of parameters is MA2={3, 9, 15, 21, 27, 33, 39, 45, 51}, HSN2=10, a carrier (indicated by MAIOs) set MAIOs2={2, 3, 5, 6, 7}, and a maximum carrier frequency spacing (indicated by a frequency channel number spacing) supported by a receiving end is 25. Carriers corresponding to MAIOs1={0, 1, 3, 4, 6, 7} are numbered as a carrier 1, a carrier 2, a carrier 3, a carrier 4, a carrier 5, and a carrier 6, and carriers corresponding to MAIOs2={2, 3, 5, 6, 7} are numbered as a carrier 7, a carrier 8, a carrier 9, a carrier 10, and a carrier 11.

Acquired ARFCNs are shown in Table 9.

TABLE 9

| FN | ARFCN of a carrier 1 | ARFCN of a carrier 2 | ARFCN of a carrier 3 | ARFCN of a carrier 4 | ARFCN of a carrier 5 | ARFCN of a carrier 6 | ARFCN of a carrier 7 | ARFCN of a carrier 8 | ARFCN of a carrier 9 | ARFCN of a carrier 10 | ARFCN of a carrier 11 |
|---|---|---|---|---|---|---|---|---|---|---|---|
| 0 | 1 | 7 | 19 | 25 | 37 | 43 | 15 | 21 | 33 | 39 | 45 |
| 1 | 7 | 13 | 25 | 31 | 43 | 1 | 21 | 27 | 39 | 45 | 51 |
| 2 | 19 | 25 | 37 | 43 | 7 | 13 | 39 | 45 | 3 | 9 | 15 |
| 3 | 25 | 31 | 43 | 1 | 13 | 19 | 39 | 45 | 3 | 9 | 15 |

It should be noted that in a preferred implementation manner of Embodiment 1 to Embodiment 4, before step 402, step 502, step 602, or step 702, ARFCNs of all carriers in any frame corresponding to a radio block may be sorted. In a case of multiple MAs, a search process may be simplified. Certainly, the implementation manner herein is merely used as a preferred manner for description, and the foregoing sorting step may not be performed, which does not affect implementation of the objective of the disclosure. For example, after ARFCNs of all the carriers in the first frame corresponding to the radio block are sorted, an obtained result is shown in Table 10.

TABLE 10

| FN | ARFCN of a carrier 1 | ARFCN of a carrier 2 | ARFCN of a carrier 7 | ARFCN of a carrier 3 | ARFCN of a carrier 8 | ARFCN of a carrier 4 | ARFCN of a carrier 9 | ARFCN of a carrier 5 | ARFCN of a carrier 10 | ARFCN of a carrier 6 | ARFCN of a carrier 11 |
|---|---|---|---|---|---|---|---|---|---|---|---|
| 0 | 1 | 7 | 15 | 19 | 21 | 25 | 33 | 37 | 39 | 43 | 45 |
| 1 | 7 | 13 | 21 | 25 | 27 | 31 | 39 | 43 | 45 | 1 | 51 |
| 2 | 19 | 25 | 39 | 37 | 45 | 43 | 3 | 7 | 9 | 13 | 15 |
| 3 | 25 | 31 | 39 | 43 | 45 | 1 | 3 | 13 | 9 | 19 | 15 |

For the result (refer to Table 10) obtained after the sorting, a carrier selection result finally obtained by using the method in Embodiment 4 is {carrier 4, carrier 9, carrier 5, carrier 10, carrier 11}.

For the result (refer to Table 9) obtained without sorting, a carrier selection result finally obtained by using the method in Embodiment 4 is {carrier 4, carrier 5, carrier 9, carrier 10, carrier 11}.

For the result (refer to Table 10) obtained after the sorting, a carrier selection result obtained by using the search method in Embodiment 1 is {carrier 4, carrier 5, carrier 9, carrier 10}.

For the result (refer to Table 9) obtained without sorting, a carrier selection result obtained by using the search method in Embodiment 1 is {carrier 9, carrier 10, carrier 11}.

The results are the same as those in Embodiment 1, and are not described herein. It may be learned from this embodiment that carriers of the result that is obtained after the sorting and obtained by using the search manner in Embodiment 1 are one more carrier selected than carriers of the result that is obtained without sorting and obtained by using the search manner in Embodiment 1; however, complexity in a case in which sorting is not performed is obviously relatively low. In a case in which sorting is not performed and the search method in Embodiment 1 is used, the step of sorting ARFCNs in a case of multiple MAs is not performed, which causes neglect of a case in which ranges of ARFCNs overlap in the case of multiple MAs; therefore, a loss occurs in carrier selection performance in a single-user scenario. In Embodiment 4, a condition for ending a search is relatively loose, and a carrier selection result of Embodiment 4 is that five carriers are selected regardless of whether in a case in which sorting is performed or in a case in which sorting is not performed; therefore, in the single-user scenario, performance is more desirable than performance of Embodiment 1; however, search complexity of Embodiment 4 is also obviously higher than that of Embodiment 1.

This embodiment of the disclosure provides a carrier selection method for multicarrier. Different carriers are selected as anchor carriers. Carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high, and there is a specific throughput loss caused by that a theoretically optimal solution cannot be obtained by using a priority-based method.

It should be noted that when the carrier selection method for multicarrier provided in this embodiment of the disclosure is applied to a case in which frequency hopping is performed on a carrier and a case in which frequency hopping is not performed on a carrier, specific implementation principles and implementation steps are the same. For example, in a case in which frequency hopping is not performed on any carrier, ARFCNs of each carrier in all frames are the same; therefore, the foregoing various carrier selection methods may be performed only on a basis of an ARFCN corresponding to any frame, and all radio blocks are the same. In a case in which frequency hopping is performed on some carriers, and frequency hopping is not performed on other carriers, only values of ARFCNs that are corresponding to each carrier on which frequency hopping is not performed and are in all frames are the same, and a carrier search method is the same as that in previous descriptions. For example, a network allocates two groups of frequency parameters to a terminal. One group is frequency parameters in a case in which frequency hopping is performed, and specific parameters are as follows: MA={1, 10, 19, 28, 37, 46, 55, 64, 73, 82}, HSN=10, and a carrier (indicated by MAIOs) set is {0, 2, 3, 4}. The other group is frequency parameters in a case in which frequency hopping is not performed, where ARFCN=25, and a maximum carrier frequency spacing (indicated by a frequency channel number spacing) supported by a receiving end is 25.

Carriers on which frequency hopping is performed that are corresponding to MAIOs={0, 2, 3, 4} are numbered as a carrier 1, a carrier 2, a carrier 3, and a carrier 4. A carrier on which frequency hopping is not performed is numbered as a carrier 5. For obtained ARFCNs, refer to Table 11.

TABLE 11

| FN | ARFCN of a carrier 1 | ARFCN of a carrier 2 | ARFCN of a carrier 3 | ARFCN of a carrier 4 | ARFCN of a carrier 5 |
| --- | --- | --- | --- | --- | --- |
| 0 | 1 | 19 | 28 | 37 | 25 |
| 1 | 10 | 28 | 37 | 46 | 25 |
| 2 | 28 | 46 | 55 | 64 | 25 |
| 3 | 37 | 55 | 64 | 73 | 25 |

An embodiment of the disclosure provides a carrier selection device 80 for multicarrier, and the carrier selection device 80 provided in this embodiment of the disclosure may be used for selection of a downlink multicarrier, or may be used for selection of an uplink multicarrier. The carrier selection device 80 may be disposed on a base station side, or may be a base station; or the carrier selection device 80 may be disposed on a terminal side, or may be a terminal such as a mobile phone.

Figure 8:
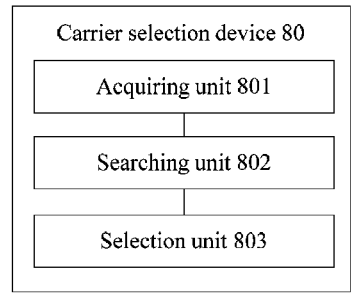
FIG. 8 is a schematic structural apparatus diagram of a carrier selection device for multicarrier according to an embodiment of the disclosure.

Referring to FIG. 8, FIG. 8 shows a carrier selection device 80 for multicarrier according to an embodiment of the disclosure. As shown in the figure, the device 80 may include:

an acquiring unit 801, configured to acquire an absolute radio frequency channel number ARFCN that is of each carrier of N carriers allocated to a receiving end and in each frame of a radio block, where N is a positive integer, and N≥2;

a searching unit 802, configured to: select, from the N carriers, a different carrier as an anchor carrier, and search within a search range of the anchor carrier according to the ARFCN that is of each carrier of the N carriers in each frame of the radio block and acquired by the acquiring unit 801 and a maximum carrier frequency spacing supported by the receiving end, to determine a carrier set of the anchor carrier; and a selection unit 803, configured to select, from the carrier sets that are of anchor carriers of the N carriers and determined by the searching unit 802, at least one carrier set as a carrier selection result.

Further, the acquiring unit 801 may be configured to:

calculate an ARFCN of any carrier of the N carriers in each frame of the radio block according to a frequency parameter that is of the any carrier and carried in an assign message, where the frequency parameter includes a mobile radio frequency channel allocation set MA, a hopping sequence number HSN, and a mobile allocation index offset MAIO;

or set a designated ARFCN that is of any carrier and carried in an assign message as an ARFCN of the any carrier in each frame.

A quantity of the foregoing MAs may be greater than or equal to 2, that is, in this embodiment of the disclosure, the carrier selection device 80 may be applied to a case of one MA, or may be applied to a case of multiple MAs. For example, if the assign message carries two groups of frequency resource parameters, where a first group of frequency resource parameters is: MA1={1, 7, 13, 19, 25}, HSN1=10, and MAIO1={0, 1, 3, 4}, and a second group is: MA2={3, 9, 15, 21, 27}, HSN2=10, and MAIO2={2, 3, 5}, all carriers corresponding to the two groups of frequency resource parameters may be used as the N carriers acquired by the acquiring unit 801. An execution process in the case of multiple MAs is the same as that in the case of one MA, and implementation of the objective of the disclosure is not affected. Therefore, this embodiment of the disclosure sets no limitation on the quantity of the MAs.

Further, referring to FIG. 8, the searching unit 802 may include an anchor carrier selection module 8021 and a searching module 8022.

Specifically, the anchor carrier selection module 8021 is configured to determine the anchor carrier, and the anchor carrier may be determined in any one of the following manners.

Manner 1: Each carrier of the N carriers is used as the anchor carrier.

In manner 1, each carrier is used as the anchor carrier for one search, and an order in which the carriers are used as the anchor carriers may change, provided that it is ensured that each carrier is used as the anchor carrier for one search. A quantity of searches in this manner is relatively large, and carrier selection performance is relatively desirable in a single-user scenario.

Manner 2: All carriers of the N carriers are sequentially used as the anchor carriers according to a preset first direction.

In manner 2, each carrier is used as the anchor carrier for one search, and manner 2 differs from manner 1 in that all the carriers are used as the anchor carriers in a specific order. This embodiment of the disclosure does not set a specific limitation on the preset first direction. For example, the preset first direction may include:

an ascending-order direction of carrier IDs of the N carriers; or a descending-order direction of carrier IDs of the N carriers; or an ascending-order direction of ARFCNs of the N carriers in any frame of the radio block; or a descending-order direction of ARFCNs of the N carriers in any frame of the radio block.

The foregoing carrier ID may be a carrier number configured on a network side, or may be a carrier ID determined after sorting according to a size of an MAIO in an MAIO set. For example, when MAIOs={0, 3, 2}, and corresponding carrier numbers configured on the network side are {0, 1, 2}, carrier IDs {0, 1, 2} corresponding to carrier numbers {0, 2, 1} are obtained after sorting is performed in ascending order of the MAIO values.

Manner 3: The first carrier in the preset first direction is selected, from the N carriers, as a first anchor carrier according to the preset first direction; after a search within a search range of the first anchor carrier ends, and a carrier set of the first anchor carrier is determined, a next carrier that is of the N carriers in the preset first direction and adjacent to a carrier at the most front in the preset first direction in the carrier set of the first anchor carrier is determined; and if the next carrier is located in front of the first anchor carrier in the preset first direction, the next carrier is used as a second anchor carrier.

A description of the preset first direction is consistent with the description of the preset first direction in manner 2, and details are not described again.

In the foregoing manner 3, a quantity of carriers selected as anchor carriers is reduced, and calculation complexity is significantly decreased.

The search range of the anchor carrier may include all carriers, except the anchor carrier, of the N carriers.

Optionally, for the foregoing manner 2 and manner 3 of selecting the anchor carrier, the search range of the anchor carrier may also be from a next carrier that is of the N carriers in the preset first direction and adjacent to the anchor carrier to the last carrier of the N carriers in the preset first direction, so that the search range of the anchor carrier is narrowed, and complexity is further decreased.

The searching module 8022 is configured to search within the search range of the anchor carrier according to the ARFCN of each carrier in each frame of the radio block and the maximum carrier frequency spacing supported by the receiving end, to determine the carrier set of the anchor carrier, which may be implemented in manner 1 or manner 2 below.

Manner 1: A first carrier is selected, according to a preset search direction, from a carrier that is not searched within the search range of the anchor carrier, and a difference between a largest ARFCN and a smallest ARFCN of ARFCNs that are of the first carrier and all carriers in a first set of the anchor carrier and in each frame of the radio block is calculated. If the difference between the largest ARFCN and the smallest ARFCN of the ARFCNs that are of the first carrier and all the carriers in the first set and in any frame of the radio block is greater than the maximum carrier frequency spacing supported by the receiving end, the search within the search range of the anchor carrier ends, and the first set is used as the carrier set of the anchor carrier. If the difference between the largest ARFCN and the smallest ARFCN of the ARFCNs that are of the first carrier and all the carriers in the first set and in each frame of the radio block is not greater than the maximum carrier frequency spacing supported by the receiving end, the first carrier is added to the first set.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

The preset search direction may include any one of the following: an ascending-order direction of carrier IDs of all carriers within the search range of the anchor carrier; a descending-order direction of carrier IDs of all carriers within the search range of the anchor carrier; an ascending-order direction of ARFCNs that are of all carriers within the search range of the anchor carrier and in any frame of the radio block; a descending-order direction of ARFCNs that are of all carriers within the search range of the anchor carrier and in any frame of the radio block; and a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and 1<i<N.

The $i^{th}$ carrier may be specifically the $i^{th}$ carrier obtained after sorting according to carrier IDs, or may be the $i^{th}$ carrier obtained after sorting according to ARFCNs.

Manner 2: A first carrier is selected from a carrier that is not searched within the search range of the anchor carrier, and a difference between a largest ARFCN and a smallest ARFCN of ARFCNs that are of the first carrier and all carriers in a first set of the anchor carrier and in each frame of the radio block is calculated. If the difference between the largest ARFCN and the smallest ARFCN of the ARFCNs that are of the first carrier and all the carriers in the first set and in each frame of the radio block is not greater than the maximum carrier frequency spacing supported by the receiving end, the selected first carrier is added to the first set. Then it is determined whether there is a carrier that is not searched within the search range of the anchor carrier; and if there is a carrier that is not searched within the search range of the anchor carrier, a second carrier is selected from the carrier that is not searched within the search range of the anchor carrier. Or if there is no carrier that is not searched within the search range of the anchor carrier, the search within the search range of the anchor carrier ends, and the first set is used as the carrier set of the anchor carrier.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In the foregoing manner 1, when the searching module 8022 searches within a search range of an anchor carrier, a search end flag is that a difference between a largest ARFCN and a smallest ARFCN in any frame is greater than the maximum carrier frequency spacing supported by the receiving end. Therefore, a carrier within the search range of the anchor carrier cannot always be obtained by searching, and a search process is simple.

In the foregoing manner 2, when the searching module 8022 searches within a search range of an anchor carrier, if a difference between a largest ARFCN and a smallest ARFCN in any frame is greater than the maximum carrier frequency spacing supported by the receiving end, the search performed for the anchor carrier does not end, and instead, a next carrier is further selected for calculation from a carrier that is not searched within the search range of the anchor carrier. Therefore, the carrier within the search range corresponding to the specific anchor carrier can be obtained by searching. A search process is more complex than the search process in manner 1; however, in a single-user scenario, obtained carrier selection performance is more desirable than performance in the foregoing manner 1.

Further, when a single channel is configured for the receiving end, the selection unit 803 may be configured to select, from the carrier sets of anchor carriers of the N carriers, one carrier set that includes a largest quantity of carriers as a carrier selection result of the single channel.

When there are at least two carrier sets, each including a largest quantity of carriers, the carrier selection result of the single channel may be determined according to sums of carrier IDs of the carriers included in the at least two carrier sets. For example, a carrier set that has a smallest sum of carrier IDs of the included carriers is selected, or a carrier set that has a largest sum of carrier IDs of the included carriers is selected. In addition, when the anchor carrier is being selected according to the preset first direction, a carrier set that first appears and includes a largest quantity of carriers may also be used as the carrier selection result of the single channel. No limitation is set herein.

When multiple channels are configured for the receiving end, the selection unit 803 may be configured to determine a carrier selection result of each channel of the multiple channels according to a quantity of carriers included in the carrier set that is of each anchor carrier of the N carriers and determined by the searching unit 802 and the sum of carrier IDs of the carriers included in each anchor carrier of the N carriers.

For example, a carrier set that is in the carrier sets of the anchor carriers and includes a largest quantity of carriers is allocated to a first channel. A carrier set that is in remaining carrier sets and includes a largest quantity of carriers is allocated to a second channel. When there are at least two carrier sets, each including a largest quantity of carriers, allocation may be performed according to sums of carrier IDs of the included carriers; or, in a case in which the anchor carrier is being selected according to the preset first direction, allocation may be performed in an order in which the carrier sets appear. For example, a carrier set that first appears and includes a largest quantity of carriers is allocated to the first channel. Details are not described again.

Optionally, for different channel configurations of the receiving end, the searching unit 802 may flexibly select a search manner. For example, for a receiving end configured with a single channel, the searching unit 802 directly searches once in the search manner in the foregoing manner 1 or manner 2. For a receiving end configured with multiple channels and supporting contiguous reception on multiple frequency bands, which is also referred to as inter-band reception, referring to FIG. 3A, for carrier allocation scenarios with different MAs, the searching unit 802 only needs to separately perform carrier selection in the search manner in the foregoing manner 1 or manner 2, to obtain carrier set results of different frequency bands. For example, if MA1={1, 10, 19, 28, 37, 46}, which belongs to a frequency band 1, and MA2={512, 521, 530, 539, 548}, which belongs to a frequency band 2 (where frequency channel numbers 1 to 124 belong to the frequency band 1, and frequency channel numbers 512 to 885 belong to the frequency band 2), for allocated carriers corresponding to different MAs, tables of ARFCNs on different frequency bands are separately listed, searches are separately performed according to the tables of ARFCNs on different frequency bands, to acquire carrier sets obtained after searching on each frequency band, and one carrier set is selected, from the carrier sets on each frequency band, as a final carrier set result.

Optionally, when multiple channels are configured for the receiving end, the selection unit 803 is configured to select, from the carrier sets that are of the anchor carriers of the N carriers and determined by the searching unit 802, one carrier set as a carrier selection result of a first channel of the multiple channels, and transmit the carrier selection result of the first channel to the searching unit 802. The searching unit 802 is further configured to obtain M carriers by excluding the carrier in the carrier selection result that is of the first channel and selected by the selection unit 803 from the N carriers; and respectively select, from the M carriers, a different carrier as an anchor carrier, determine a first search range of the anchor carrier in the M carriers, search within the first search range of the anchor carrier according to ARFCNs of the M carriers in each frame of the radio block and the maximum carrier frequency spacing supported by the receiving end, and determine a first carrier set of the anchor carrier. And the selection unit 803 is further configured to select, from the first carrier sets that are of the anchor carriers of the M carriers and determined by the searching unit 802, one carrier set as a carrier selection result of a second channel of the multiple channels.

For the receiving end configured with multiple channels, if the receiving end performs non-contiguous reception on one frequency band by using the multiple channels, one search is performed on the frequency band, and carrier sets whose quantity is the same as that of receive channels are selected, or multiple searches are performed according to a quantity of receive channels.

For example, referring to FIG. 3B, a receiving end is configured with dual channels, and performs non-contiguous reception on one frequency band (where a GSM900 frequency band is used as an example in the figure), which is also referred to as intra-band non-contiguous reception. The following two methods may be used for carrier selection.

(1) Multiple carrier sets are selected from one search result.

If there are at least two carrier sets that include a largest and same quantity of carriers, for a receiving end configured with dual receive channels, two carrier sets that each have a smallest sum of carrier IDs of the included carriers and include a largest quantity of carriers are selected as a carrier selection result. Or if there are not at least two carrier sets that include a largest and same quantity of carriers, a carrier set that includes a largest quantity of carriers and a carrier set that includes a second largest quantity of carriers are selected as a carrier selection result.

(2) Multiple searches are performed, and one carrier set is selected, from carrier sets that are of anchor carriers and obtained after each search, as a carrier selection result.

After the first search ends, a carrier selection result is excluded from an initial carrier set of the second carrier search.

For example, if allocated carrier IDs are 1 to 6, and carriers involved in the first search include all the carriers, that is, a carrier 1 to a carrier 6, a search result of the first search is {carrier 1, carrier 2}, which is used as a carrier selection result of the first receive channel. For the second search, the carrier 1 and the carrier 2 are excluded from allocated carrier sets, and the search is performed only for the carrier 3 to the carrier 6, and a search result of the second search is used as a carrier selection result of the second receive channel.

Figure 9:
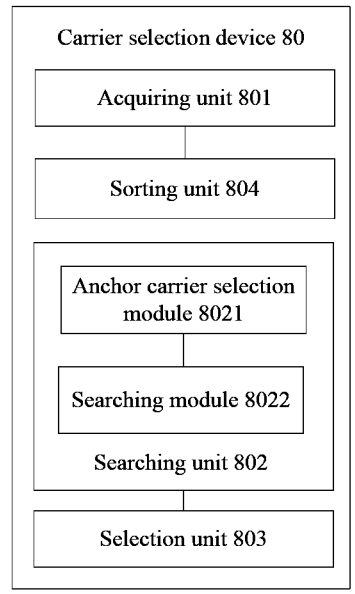
FIG. 9 is a schematic structural apparatus diagram of another carrier selection device for multicarrier according to an embodiment of the disclosure.

Optionally, referring to FIG. 9, the device further includes a sorting unit 804, configured to: before the searching unit 802 selects, from the N carriers, the different carrier as the anchor carrier, and searches within the search range of the anchor carrier according to the ARFCN of each carrier in each frame of the radio block and the maximum carrier frequency spacing supported by the receiving end, to determine the carrier set of the anchor carrier, sort ARFCNs of all the carriers in any frame corresponding to the radio block.

This embodiment of the disclosure provides a carrier selection device 80 for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

Figure 10:
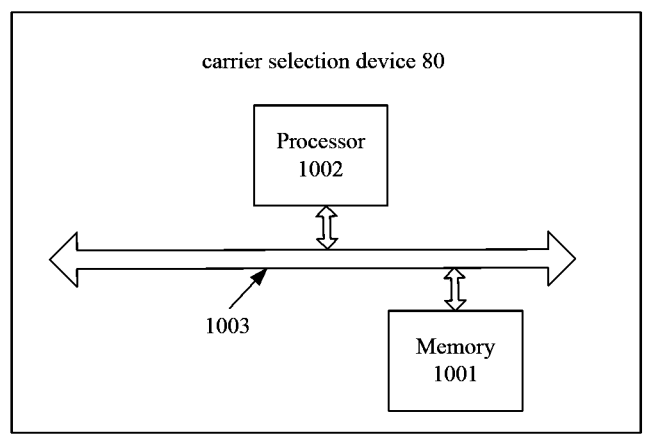
FIG. 10 is a schematic structural apparatus diagram of another carrier selection device for multicarrier according to an embodiment of the disclosure.

Referring to FIG. 10, FIG. 10 is a specific schematic structural diagram of a carrier selection device 80 for multicarrier according to an embodiment of the disclosure. As shown in FIG. 10, FIG. 10 shows the specific embodiment of the carrier selection device 80. In this embodiment, the carrier selection device 80 includes a processor 1002 and a memory 1001, where the processor 1002 is configured for implementing an operation of the carrier selection device 80. The memory 1001 may include a read-only memory and a random access memory, and provides an instruction and data for the processor 1002. A part of the memory 1001 may further include a non-volatile random access memory (NVRAM). In a specific application, the carrier selection device 80 may be built into or may be a base station, a terminal device, or the like. All components of the carrier selection device 80 are coupled together by using a bus system 1003. In addition to a data bus, the bus system 1003 includes a power bus, a control bus, and a status signal bus. However, for clarity of description, various buses are marked as the bus system 1003 in FIG. 10.

The carrier selection method for multicarrier disclosed in the foregoing embodiment of the disclosure may be applied in the processor 1002, or may be implemented by the processor 1002. The processor 1002 may be an integrated circuit chip, and is capable of executing an instruction and data and processing a signal. In an implementation process, the steps of the foregoing method may be completed by using an integrated logic circuit of hardware in the processor 1002 or an instruction in a form of software. The foregoing processor 1002 may be a general-purpose processor (CPU), a digital signal processor (DSP), an application-specific integrated circuit (ASIC), a field programmable gate array (FPGA), another programmable logic component, a discrete gate or a transistor logic component, or a discrete hardware assembly, and may implement or execute all methods, steps, and logic block diagrams disclosed in the embodiments of the disclosure. The processor 1002 may be a microprocessor, or the processor 1002 may be any conventional processor or the like. The steps of the carrier selection methods for multicarrier disclosed with reference to the embodiments of the disclosure may be directly executed by a hardware processor, or may be executed by using a combination of hardware and software modules in the processor 1002. The software module may be located in a mature storage medium in the prior art, such as a random memory, a flash memory, a read-only memory, a programmable read-only memory, an electrically erasable programmable memory, or a register. The storage medium is located in the memory 1001. The processor 1002 reads information from the memory 1001, and completes the steps of the foregoing method in combination with hardware of the processor 1002.

The processor 1002 may be configured to: acquire an absolute radio frequency channel number ARFCN that is of each carrier of N carriers allocated to a receiving end and in each frame of a radio block, where N is a positive integer, and N≥2;

respectively select, from the N carriers, a different carrier as an anchor carrier, and search within a search range of the anchor carrier according to the ARFCN of each carrier in each frame of the radio block and a maximum carrier frequency spacing supported by the receiving end, to determine a carrier set of the anchor carrier; and select, from the carrier sets of anchor carriers of the N carriers, at least one carrier set as a carrier selection result.

Further, the processor 1002 may be configured to:

calculate an ARFCN of any carrier of the N carriers in each frame of the radio block according to a frequency parameter that is of the any carrier and carried in an assign message, where the frequency parameter includes a mobile radio frequency channel allocation set MA, a hopping sequence number HSN, and a mobile allocation index offset MAIO;

or set a designated ARFCN that is of any carrier and carried in an assign message as an ARFCN of the any carrier in each frame.

A quantity of the foregoing MAs may be greater than or equal to 2, that is, in this embodiment of the disclosure, the carrier selection device 80 may be applied to a case of one MA, or may be applied to a case of multiple MAs. For example, if the assign message carries two groups of frequency resource parameters, where a first group of frequency resource parameters is: MA1={1, 7, 13, 19, 25}, HSN1=10, and MAIO1={0, 1, 3, 4}, and a second group is: MA2={3, 9, 15, 21, 27}, HSN2=10, and MAIO2={2, 3, 5}, all carriers corresponding to the two groups of frequency resource parameters may be used as the acquired N carriers. An execution process in the case of multiple MAs is the same as that in the case of one MA, and implementation of the objective of the disclosure is not affected. Therefore, this embodiment of the disclosure sets no limitation on the quantity of the MAs.

Further, the processor 1002 may be configured to select the anchor carrier in any one of the following three manners.

Manner 1: Each carrier of the N carriers is used as the anchor carrier.

In manner 1, each carrier is used as the anchor carrier for one search, and an order in which the carriers are used as the anchor carriers may change, provided that it is ensured that each carrier is used as the anchor carrier for one search. A quantity of searches in this manner is relatively large, and carrier selection performance is relatively desirable in a single-user scenario.

Manner 2: All carriers of the N carriers are sequentially used as the anchor carriers according to a preset first direction.

In manner 2, each carrier is used as the anchor carrier for one search, and manner 2 differs from manner 1 in that all the carriers are used as the anchor carriers in a specific order. This embodiment of the disclosure does not set a specific limitation on the preset first direction. For example, the preset first direction may include: an ascending-order direction of carrier IDs of the N carriers; a descending-order direction of carrier IDs of the N carriers; an ascending-order direction of ARFCNs of the N carriers in any frame of the radio block; or a descending-order direction of ARFCNs of the N carriers in any frame of the radio block.

The foregoing carrier ID may be a carrier number configured on a network side, or may be a carrier ID determined after sorting according to a size of an MAIO in an MAIO set. For example, when MAIOs={0, 3, 2}, and corresponding carrier numbers configured on the network side are {0, 1, 2}, carrier IDs {0, 1, 2} corresponding to carrier numbers {0, 2, 1} are obtained after sorting is performed in ascending order of the MAIO values.

Manner 3: The first carrier in the preset first direction is selected, from the N carriers, as a first anchor carrier according to the preset first direction; after a search within a search range of the first anchor carrier ends, and a carrier set of the first anchor carrier is determined, a next carrier that is of the N carriers in the preset first direction and adjacent to a carrier at the most front in the preset first direction in the carrier set of the first anchor carrier is determined; and if the next carrier is located in front of the first anchor carrier in the preset first direction, the next carrier is used as a second anchor carrier.

A description of the preset first direction is consistent with the description of the preset first direction in manner 2, and details are not described again.

In the foregoing manner 3, a quantity of carriers selected as anchor carriers is reduced, and calculation complexity is significantly decreased.

The search range of the anchor carrier may include all carriers, except the anchor carrier, of the N carriers.

Optionally, for the foregoing manner 2 and manner 3 of selecting the anchor carrier, the search range of the anchor carrier may also be from a next carrier that is of the N carriers in the preset first direction and adjacent to the anchor carrier to the last carrier of the N carriers in the preset first direction, so that the search range of the anchor carrier is narrowed, and complexity is further decreased.

Further, the processor 1002 may implement the following in manner 1 or manner 2 below: searching within the search range of the anchor carrier according to the ARFCN of each carrier in each frame of the radio block and the maximum carrier frequency spacing supported by the receiving end, to determine the carrier set of the anchor carrier.

Manner 1: A first carrier is selected, according to a preset search direction, from a carrier that is not searched within the search range of the anchor carrier, and a difference between a largest ARFCN and a smallest ARFCN of ARFCNs that are of the first carrier and all carriers in a first set of the anchor carrier and in each frame of the radio block is calculated. If the difference between the largest ARFCN and the smallest ARFCN of the ARFCNs that are of the first carrier and all the carriers in the first set and in any frame of the radio block is greater than the maximum carrier frequency spacing supported by the receiving end, the search within the search range of the anchor carrier ends, and the first set is used as the carrier set of the anchor carrier. Or if the difference between the largest ARFCN and the smallest ARFCN of the ARFCNs that are of the first carrier and all the carriers in the first set and in each frame of the radio block is not greater than the maximum carrier frequency spacing supported by the receiving end, the first carrier is added to the first set.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

The preset search direction may include any one of the following: an ascending-order direction of carrier IDs of all carriers within the search range of the anchor carrier; a descending-order direction of carrier IDs of all carriers within the search range of the anchor carrier; an ascending-order direction of ARFCNs that are of all carriers within the search range of the anchor carrier and in any frame of the radio block; a descending-order direction of ARFCNs that are of all carriers within the search range of the anchor carrier and in any frame of the radio block; and a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier includes all carriers, except the $i^{th}$ carrier, of the N carriers, where i is a positive integer, and $1<i<N$.

The $i^{th}$ carrier may be specifically the $i^{th}$ carrier obtained after sorting according to carrier IDs, or may be the $i^{th}$ carrier obtained after sorting according to ARFCNs.

Manner 2: A first carrier is selected from a carrier that is not searched within the search range of the anchor carrier, and a difference between a largest ARFCN and a smallest ARFCN of ARFCNs that are of the first carrier and all carriers in a first set of the anchor carrier and in each frame of the radio block is calculated. If the difference between the largest ARFCN and the smallest ARFCN of the ARFCNs that are of the first carrier and all the carriers in the first set and in each frame of the radio block is not greater than the maximum carrier frequency spacing supported by the receiving end, the selected first carrier is added to the first set. Then it is determined whether there is a carrier that is not searched within the search range of the anchor carrier. If there is a carrier that is not searched within the search range of the anchor carrier, a second carrier is selected from the carrier that is not searched within the search range of the anchor carrier. Or if there is no carrier that is not searched within the search range of the anchor carrier, the search within the search range of the anchor carrier ends, and the first set is used as the carrier set of the anchor carrier.

The first set includes at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

In the foregoing manner 1, when the processor 1002 searches within a search range of an anchor carrier, a search end flag is that a difference between a largest ARFCN and a smallest ARFCN in any frame is greater than the maximum carrier frequency spacing supported by the receiving end. Therefore, a carrier within the search range of the anchor carrier cannot always be obtained by searching, and a search process is simple.

In the foregoing manner 2, when the processor 1002 searches within a search range of an anchor carrier, if a difference between a largest ARFCN and a smallest ARFCN in any frame is greater than the maximum carrier frequency spacing supported by the receiving end, the search performed for the anchor carrier does not end, and instead, a next carrier is further selected for calculation from a carrier that is not searched within the search range of the anchor carrier. Therefore, the carrier within the search range corresponding to the specific anchor carrier can be obtained by searching. A search process is more complex than the search process in manner 1; however, in a single-user scenario, obtained carrier selection performance is more desirable than performance in the foregoing manner 1.

Further, when a single channel is configured for the receiving end, the processor 1002 may be configured to select, from the carrier sets of the anchor carriers of the N carriers, one carrier set that includes a largest quantity of carriers as a carrier selection result of the single channel.

When there are at least two carrier sets, each including a largest quantity of carriers, the carrier selection result of the single channel may be determined according to sums of carrier IDs of the carriers included in the at least two carrier sets. For example, a carrier set that has a smallest sum of carrier IDs of the included carriers is selected, or a carrier set that has a largest sum of carrier IDs of the included carriers is selected. In addition, when the anchor carrier is being selected according to the preset first direction, a carrier set that first appears and includes a largest quantity of carriers may also be used as the carrier selection result of the single channel. No limitation is set herein.

When multiple channels are configured for the receiving end, the processor 1002 may be configured to determine a carrier selection result of each channel of the multiple channels according to a quantity of carriers included in the carrier set of each anchor carrier of the N carriers and the sum of carrier IDs of the carriers included in each anchor carrier of the N carriers.

For example, a carrier set that is in the carrier sets of the anchor carriers and includes a largest quantity of carriers is allocated to a first channel, and a carrier set that is in remaining carrier sets and includes a largest quantity of carriers is allocated to a second channel. When there are at least two carrier sets, each including a largest quantity of carriers, allocation may be performed according to sums of carrier IDs of the included carriers; or, in a case in which the anchor carrier is being selected according to the preset first direction, allocation may be performed in an order in which the carrier sets appear. For example, a carrier set that first appears and includes a largest quantity of carriers is allocated to the first channel. Details are not described again.

Optionally, for different channel configurations of the receiving end, the processor 1002 may flexibly select a search manner. For example, for a receiving end configured with a single channel, the processor 1002 directly searches once in the search manner of the foregoing manner 1 or manner 2. For a receiving end configured with multiple channels and supporting contiguous reception on multiple frequency bands, which is also referred to as inter-band reception, referring to FIG. 3A, for carrier allocation scenarios with different MAs, the processor 1002 only needs to separately perform carrier selection in the search manner in the foregoing manner 1 or manner 2, to obtain carrier set results of different frequency bands. For example, if MA1={1, 10, 19, 28, 37, 46}, which belongs to a frequency band 1, and MA2={512, 521, 530, 539, 548}, which belongs to a frequency band 2 (where frequency channel numbers 1 to 124 belong to the frequency band 1, and frequency channel numbers 512 to 885 belong to the frequency band 2), for allocated carriers corresponding to different MAs, tables of ARFCNs on different frequency bands are separately listed, searches are separately performed according to the tables of ARFCNs on different frequency bands, to acquire carrier sets obtained after searching on each frequency band, and one carrier set is selected, from the carrier sets on each frequency band, as a final carrier set result.

Optionally, when multiple channels are configured for the receiving end, the processor 1002 is configured to:
  select, from the carrier sets of the anchor carriers, one carrier set as a carrier selection result of a first channel of the multiple channels;
  obtain M carriers by excluding the carrier in the carrier selection result of the first channel from the N carriers;
  respectively select, from the M carriers, a different carrier as an anchor carrier, determine a first search range of the anchor carrier in the M carriers, search within the first search range of the anchor carrier according to ARFCNs of the M carriers in each frame of the radio block and the maximum carrier frequency spacing supported by the receiving end, and determine a first carrier set of the anchor carrier; and
  select, from the first carrier sets of anchor carriers of the M carriers, one carrier set as a carrier selection result of a second channel of the multiple channels.

For the receiving end configured with multiple channels, if the receiving end performs non-contiguous reception on one frequency band by using the multiple channels, one search is performed on the frequency band, and carrier sets whose quantity is the same as that of receive channels are selected, or multiple searches are performed according to a quantity of receive channels.

For example, referring to FIG. 3B, a receiving end is configured with dual channels, and performs non-contiguous reception on one frequency band (where a GSM900 frequency band is used as an example in the figure), which is also referred to as intra-band non-contiguous reception. The following two methods may be used for carrier selection.

(1) Multiple carrier sets are selected from one search result.

If there are at least two carrier sets that include a largest and same quantity of carriers, for a receiving end configured with dual receive channels, two carrier sets that each have a smallest sum of carrier IDs of the included carriers and include a largest quantity of carriers are selected as a carrier selection result. Or if there are not at least two carrier sets that include a largest and same quantity of carriers, a carrier set that includes a largest quantity of carriers and a carrier set that includes a second largest quantity of carriers are selected as a carrier selection result.

(2) Multiple searches are performed, and one carrier set is selected, from carrier sets that are of anchor carriers and obtained after each search, as a carrier selection result.

After the first search ends, a carrier selection result is excluded from an initial carrier set of the second carrier search.

For example, if allocated carrier IDs are 1 to 6, and carriers involved in the first search include all the carriers, that is, a carrier 1 to a carrier 6, a search result of the first search is {carrier 1, carrier 2}, which is used as a carrier selection result of the first receive channel. For the second search, the carrier 1 and the carrier 2 are excluded from allocated carrier sets, and the search is performed only for the carrier 3 to the carrier 6, and a search result of the second search is used as a carrier selection result of the second receive channel.

Further, the processor 1002 is further configured to: before the different carrier is selected, from the N carriers, as the anchor carrier, and the search is performed within the search range of the anchor carrier according to the ARFCN of each carrier in each frame of the radio block and the maximum carrier frequency spacing supported by the receiving end, to determine the carrier set of the anchor carrier, sort ARFCNs of all the carriers in any frame corresponding to the radio block.

This embodiment of the disclosure provides a carrier selection device 80 for multicarrier. Different carriers are selected as anchor carriers, carrier sets corresponding to all anchor carriers are sequentially searched for according to an ARFCN of each carrier in each frame of a radio block and a maximum carrier frequency spacing supported by a receiving end, and one or more carrier sets are selected as a carrier selection result according to a preset policy, implementing that an optimal carrier combination is obtained by searching by using a method with relatively low complexity, which overcomes a defect, in the prior art, that complexity of a brute force method is extremely high.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the disclosure but not for limiting the present application. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the disclosure.

What is claimed is:

1. A carrier selection method, comprising:
for each carrier of N carriers, acquiring an absolute radio frequency channel number (ARFCN) that is of the carrier allocated to a receiving end and in each frame of a radio block, wherein N is a positive integer, and N≥2;
for each carrier of the N carriers, selecting a carrier as an anchor carrier, and searching within a search range of the anchor carrier according to the ARFCN of the carrier in each frame of the radio block and a maximum carrier frequency spacing supported by the receiving end, to determine a carrier set of the anchor carrier; and
selecting, from the carrier sets of anchor carriers of the N carriers, at least one carrier set as a carrier selection result,
wherein the searching within the search range of the anchor carrier according to the ARFCN of the carrier in each frame of the radio block and the maximum carrier frequency spacing supported by the receiving end, to determine the carrier set of the anchor carrier comprises:

selecting, according to a preset search direction, a first carrier from a carrier that is not searched within the search range of the anchor carrier, and calculating a difference between a largest ARFCN and a smallest ARFCN of ARFCNs that are of the first carrier and all carriers in a first set of the anchor carrier and in each frame of the radio block; and if the difference between the largest ARFCN and the smallest ARFCN of the ARFCNs that are of the first carrier and all the carriers in the first set and in any frame of the radio block is greater than the maximum carrier frequency spacing supported by the receiving end, ending the search within the search range of the anchor carrier, and using the first set as the carrier set of the anchor carrier; or if the difference between the largest ARFCN and the smallest ARFCN of the ARFCNs that are of the first carrier and all the carriers in the first set and in each frame of the radio block is not greater than the maximum carrier frequency spacing supported by the receiving end, adding the first carrier to the first set;

wherein the first set comprises at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

2. The method according to claim 1, wherein the selecting, for each carrier of the N carriers, a carrier as an anchor carrier comprises:

using each carrier of the N carriers as the anchor carrier.

3. The method according to claim 1, wherein the selecting, for each carrier of the N carriers, a carrier as an anchor carrier comprises:

sequentially using each carrier of the N carriers as the anchor carrier according to a preset first direction; or selecting, from the N carriers, the first carrier in a preset first direction as a first anchor carrier according to the preset first direction, after a search within a search range of the first anchor carrier ends, and a carrier set of the first anchor carrier is determined, determining a next carrier that is of the N carriers in the preset first direction and adjacent to a carrier at the most front in the preset first direction in the carrier set of the first anchor carrier; and if the next carrier is located in front of the first anchor carrier in the preset first direction, using the next carrier as a second anchor carrier.

4. The method according to claim 3, wherein the preset first direction comprises:

an ascending-order direction of carrier IDs of the N carriers; or a descending-order direction of carrier IDs of the N carriers; or an ascending-order direction of ARFCNs of the N carriers in any frame of the radio block; or a descending-order direction of ARFCNs of the N carriers in any frame of the radio block.

5. The method according to claim 3, wherein the search range of the anchor carrier is from a next carrier that is of the N carriers in the preset first direction and adjacent to the anchor carrier to the last carrier of the N carriers in the preset first direction.

6. The method according to claim 1, wherein the preset search direction comprises:

an ascending-order direction of carrier IDs of all carriers within the search range of the anchor carrier; or a descending-order direction of carrier IDs of all carriers within the search range of the anchor carrier; or an ascending-order direction of ARFCNs that are of all carriers within the search range of the anchor carrier and in any frame of the radio block; or a descending-order direction of ARFCNs that are of all carriers within the search range of the anchor carrier and in any frame of the radio block; or a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier comprises all carriers, except the $i^{th}$ carrier, of the N carriers, wherein i is a positive integer, and $1<i<N$.

7. The method according to claim 1, wherein the selecting, from the carrier sets of anchor carriers of the N carriers, at least one carrier set as the carrier selection result comprises:

when a single channel is configured for the receiving end, selecting, from the carrier sets that are of the anchor carriers of the N carriers, a carrier set that comprises a largest quantity of carriers and has a smallest sum of carrier IDs of the comprised carriers as a carrier selection result of the single channel; or selecting, from the carrier sets of the anchor carriers, a carrier set that comprises a largest quantity of carriers and has a largest sum of carrier IDs of the comprised carriers as a carrier selection result of the single channel; or when multiple channels are configured for the receiving end, determining a carrier selection result of each channel of the multiple channels according to a quantity of carriers comprised in the carrier set of each anchor carrier of the N carriers.

8. The method according to claim 1, wherein the acquiring, for each carrier of the N carriers, the ARFCN that is of the carrier allocated to the receiving end and in each frame of the radio block comprises:

calculating an ARFCN of any carrier of the N carriers in each frame of the radio block according to a frequency parameter that is of the any carrier and carried in an assign message, wherein the frequency parameter comprises a mobile radio frequency channel allocation set (MA), a hopping sequence number (HSN), and a mobile allocation index offset (MAIO); or setting a designated ARFCN that is of any carrier and carried in an assign message as an ARFCN of the any carrier in each frame.

9. A carrier selection device, comprising: a processor and a memory, wherein the memory provides an instruction and data for the processor, the processor reads information from the memory, and the processor is configured to:

for each carrier of N carriers, acquire an absolute radio frequency channel number (ARFCN) that is of the carrier allocated to a receiving end and in each frame of a radio block, wherein N is a positive integer, and $N \geq 2$;

for each carrier of the N carriers, select a carrier as an anchor carrier, and search within a search range of the anchor carrier according to the ARFCN that is of the carrier in each frame of the radio block and a maximum carrier frequency spacing supported by the receiving end, to determine a carrier set of the anchor carrier; and select, from the carrier sets that are of anchor carriers of the N carriers, at least one carrier set as a carrier selection result, wherein the searching within the search range of the anchor carrier to determine the carrier set of the anchor carrier comprises:

selecting, according to a preset search direction, a first carrier from a carrier that is not searched within the search range of the anchor carrier, and calculate a difference between a largest ARFCN and a smallest ARFCN of ARFCNs that are of the first carrier and all carriers in a first set of the anchor carrier and in each frame of the radio block; and if the difference between the largest ARFCN and the smallest ARFCN of the ARFCNs that are of the first carrier and all the carriers in the first set of the anchor carrier and in any frame of the radio block is greater than the maximum carrier frequency spacing supported by the receiving end, end the search within the search range of the anchor carrier, and use the first set of the anchor carrier as the carrier set of the anchor carrier; or if the difference between the largest ARFCN and the smallest ARFCN of the ARFCNs that are of the first carrier and all the carriers in the first set and in each frame of the radio block is not greater than the maximum carrier frequency spacing supported by the receiving end, add the first carrier to the first set of the anchor carrier;

wherein the first set of the anchor carrier comprises at least the anchor carrier, and a difference between a largest ARFCN and a smallest ARFCN of ARFCNs that are of all the carriers in the first set and in each frame of the radio block is not greater than the maximum carrier frequency spacing supported by the receiving end.

10. The device according to claim 9, wherein the processor is further configured to use each carrier of the N carriers as the anchor carrier.

11. The device according to claim 9, wherein the processor is further configured to:

sequentially use each carrier of the N carriers as the anchor carrier according to a preset first direction; or select, from the N carriers, the first carrier in a preset first direction as a first anchor carrier according to the preset first direction; after a search within a search range of the first anchor carrier ends, and a carrier set of the first anchor carrier is determined, determine a next carrier that is of the N carriers in the preset first direction and adjacent to a carrier at the most front in the preset first direction in the carrier set of the first anchor carrier; and if the next carrier is located in front of the first anchor carrier in the preset first direction, use the next carrier as a second anchor carrier.

12. The device according to claim 11, wherein the preset first direction comprises:

an ascending-order direction of carrier IDs of the N carriers; or a descending-order direction of carrier IDs of the N carriers; or an ascending-order direction of ARFCNs of the N carriers in any frame of the radio block; or a descending-order direction of ARFCNs of the N carriers in any frame of the radio block.

13. The device according to claim 11, wherein the search range of the anchor carrier is from a next carrier that is of the N carriers in the preset first direction and adjacent to the anchor carrier to the last carrier of the N carriers in the preset first direction.

14. The device according to claim 9, wherein the preset search direction comprises:

an ascending-order direction of carrier IDs of all carriers within the search range of the anchor carrier; or a descending-order direction of carrier IDs of all carriers within the search range of the anchor carrier; or an ascending-order direction of ARFCNs that are of all carriers within the search range of the anchor carrier and in any frame of the radio block; or a descending-order direction of ARFCNs that are of all carriers within the search range of the anchor carrier and in any frame of the radio block; or a direction first from the $(i+1)^{th}$ carrier of the N carriers to the $N^{th}$ carrier of the N carriers, and then from the first carrier of the N carriers to the $(i-1)^{th}$ carrier of the N carriers within the search range of the anchor carrier when the anchor carrier is the $i^{th}$ carrier of the N carriers, and the search range of the anchor carrier comprises all carriers, except the $i^{th}$ carrier, of the N carriers, wherein i is a positive integer, and $1<i<N$.

15. The device according to claim 9, wherein processor is further configured to:

when a single channel is configured for the receiving end, select, from the carrier sets that are of the anchor carriers of the N carriers, a carrier set that comprises a largest quantity of carriers and has a smallest sum of carrier IDs of the comprised carriers as a carrier selection result of the single channel; or select, from the carrier sets of the anchor carriers, a carrier set that comprises a largest quantity of carriers and has a largest sum of carrier IDs of the comprised carriers as a carrier selection result of the single channel; or when multiple channels are configured for the receiving end, determine a carrier selection result of each channel of the multiple channels according to a quantity of carriers comprised in the carrier set that is of each anchor carrier of the N carriers.

16. The device according to claim 9, wherein processor is further configured to:

calculate an ARFCN of any carrier of the N carriers in each frame of the radio block according to a frequency parameter that is of the any carrier and carried in an assign message, wherein the frequency parameter comprises a mobile radio frequency channel allocation set (MA), a hopping sequence number (HSN), and a mobile allocation index offset (MAIO); or set a designated ARFCN that is of any carrier and carried in an assign message as an ARFCN of the any carrier in each frame.

17. A carrier selection method, comprising:

for each carrier of N carriers, acquiring an absolute radio frequency channel number (ARFCN) that is of the carrier allocated to a receiving end and in each frame of a radio block, wherein N is a positive integer, and $N \geq 2$;

for each carrier of the N carriers, selecting a carrier as an anchor carrier, and searching within a search range of the anchor carrier according to the ARFCN of the carrier in each frame of the radio block and a maximum carrier frequency spacing supported by the receiving end, to determine a carrier set of the anchor carrier; and selecting, from the carrier sets of anchor carriers of the N carriers, at least one carrier set as a carrier selection result, wherein when multiple channels are configured for the receiving end, the selecting, from the carrier sets of anchor carriers of the N carriers, the at least one carrier set as the carrier selection result comprises:
selecting, from the carrier sets of the anchor carriers, one carrier set as a carrier selection result of a first channel of the multiple channels; and
wherein after the selecting, from the carrier sets of anchor carriers of the N carriers, at least one carrier set as the carrier selection result, the method further comprises:
obtaining M carriers by excluding the carrier in the carrier selection result of the first channel from the N carriers;
for each carrier of the M carriers, selecting a carrier as an anchor carrier, determining a first search range of the anchor carrier in the M carriers, searching within the first search range of the anchor carrier according to ARFCNs of the M carriers in each frame of the radio block and the maximum carrier frequency spacing supported by the receiving end, and determining a first carrier set of the anchor carrier; and
selecting, from the first carrier sets of anchor carriers of the M carriers, one carrier set as a carrier selection result of a second channel of the multiple channels.

18. A carrier selection device, comprising: a processor and a memory, wherein the memory provides an instruction and data for the processor, the processor reads information from the memory, and the processor is configured to:
for each carrier of N carriers, acquire an absolute radio frequency channel number (ARFCN) that is of the carrier allocated to a receiving end and in each frame of a radio block, wherein N is a positive integer, and N≥2;
for each carrier of the N carriers, select a carrier as an anchor carrier, and search within a search range of the anchor carrier according to the ARFCN that is of the carrier in each frame of the radio block and a maximum carrier frequency spacing supported by the receiving end, to determine a carrier set of the anchor carrier; and
select, from the carrier sets that are of anchor carriers of the N carriers, at least one carrier set as a carrier selection result,
wherein when multiple channels are configured for the receiving end, the processor is further configured to:
select, from the carrier sets of the anchor carriers of the N carriers, one carrier set as a carrier selection result of a first channel of the multiple channels;
wherein after the selecting, from the carrier sets of anchor carriers of the N carriers, the at least one carrier set as the carrier selection result, the processor is further configured to:
obtain M carriers by excluding the carrier in the carrier selection result that is of the first channel from the N carriers; and
for each carrier of the M carriers, select a carrier as an anchor carrier, determine a first search range of the anchor carrier in the M carriers, search within the first search range of the anchor carrier according to ARFCNs of the M carriers in each frame of the radio block and the maximum carrier frequency spacing supported by the receiving end, and determine a first carrier set of the anchor carrier; and
select, from the first carrier sets that are of anchor carriers of the M carriers, one carrier set as a carrier selection result of a second channel of the multiple channels.

* * * * *